(12) United States Patent
Wisdom et al.

(10) Patent No.: US 12,195,263 B2
(45) Date of Patent: Jan. 14, 2025

(54) MULTI-CHAMBER CONTAINER AND METHODS

(71) Applicants: Pacific University, Forest Grove, OR (US); GOAT Industries LLC, La Grande, OR (US)

(72) Inventors: Elias Wisdom, La Grande, OR (US); Matthew Jensen, Montesano, WA (US); Juan Andres Soria, Hillsboro, OR (US); Roman Scott Stein, Sunnyvale, CA (US); Terry Fischer O'Day, Forest Grove, OR (US); Tyler Theodore Brumfield, Forest Grove, OR (US)

(73) Assignees: PACIFIC UNIVERSITY, Forest Grove, OR (US); GOAT INDUSTRIES LLC, La Grande, OR (US)

( * ) Notice: Subject to any disclaimer, the term of this patent is extended or adjusted under 35 U.S.C. 154(b) by 368 days.

(21) Appl. No.: 17/647,326

(22) Filed: Jan. 6, 2022

(65) Prior Publication Data

US 2023/0211938 A1    Jul. 6, 2023

(51) Int. Cl.
*B65D 81/32*    (2006.01)
*A47J 43/27*    (2006.01)
(Continued)

(52) U.S. Cl.
CPC .... *B65D 81/3211* (2013.01); *B01F 33/50111* (2022.01); *A61J 1/2089* (2013.01); *B65D 1/04* (2013.01)

(58) Field of Classification Search
CPC ......... A47F 5/05; A47J 31/404; A61J 1/2093; A61J 1/2089; A61J 1/202; A61J 1/2034; A61J 1/2044; A61J 1/2031; A61J 1/2037; B65D 81/3211; B65D 21/0209; B65D 1/04; B65D 1/06; B65D 21/0201; B65D 35/22;
(Continued)

(56) References Cited

U.S. PATENT DOCUMENTS 1,385,484 A  *  7/1921  Case ...................... B65D 21/00
                                                    220/4.27
1,831,401 A  *  11/1931  Weidlich ................ A45C 11/16
                                                    312/204
(Continued)

FOREIGN PATENT DOCUMENTS

EP    1679114 A1    7/2006
FR    3024827 A1    2/2016

*Primary Examiner* — Gideon R Weinerth
(74) *Attorney, Agent, or Firm* — McCoy Russell LLP

(57) ABSTRACT

Methods and systems are provided for a multi-chambered container. In one example, a container comprising a first chamber is positioned between a liquid chamber and a second chamber, a first seal is positioned between the first chamber and the liquid chamber, and a second seal is positioned between the second chamber and the first chamber. By rotating a first external ring of the container that is positioned between the liquid chamber and the first chamber of the container a first liquid tight seal is opened to enable communication between the liquid chamber and the first chamber. The first external ring may be positioned at a first end of the liquid chamber that is opposite a second end of the liquid chamber that includes a drinking opening.

11 Claims, 14 Drawing Sheets

(51) Int. Cl.
*B01F 33/501* (2022.01)
*B65D 51/28* (2006.01)
*A61J 1/20* (2006.01)
*B65D 1/04* (2006.01)

(58) Field of Classification Search
CPC ........... B65D 81/3205; B01F 33/50111; B01F 35/7164
USPC ..... 206/219, 221, 504, 507, 509; 211/131.1, 211/163; 215/DIG. 8; 220/501, 502; 222/144; 312/201; 366/130; D7/300.1, D7/413, 509
See application file for complete search history.

(56) References Cited

U.S. PATENT DOCUMENTS

| | | | | |
|---|---|---|---|---|
| 2,396,932 | A * | 3/1946 | Slaton | A45D 33/28 206/229 |
| 2,616,568 | A * | 11/1952 | Bundgus | A47G 23/025 211/74 |
| 3,188,157 | A * | 6/1965 | Rand | A47B 87/0292 220/23.8 |
| 3,321,097 | A * | 5/1967 | Solowey | B65D 25/087 215/DIG. 8 |
| 3,450,096 | A * | 6/1969 | Lancette | A47G 19/22 118/16 |
| 3,498,471 | A * | 3/1970 | Dirkx | B65D 21/0209 211/163 |
| D267,153 | S * | 12/1982 | Lebowitz | D3/297 |
| 4,376,491 | A * | 3/1983 | Banker, Jr. | B65D 51/00 383/70 |
| 4,779,722 | A | 10/1988 | Hall | |
| 4,815,483 | A * | 3/1989 | DuGrenier | A45D 33/28 206/229 |
| 4,979,629 | A * | 12/1990 | Askerneese | A61J 9/001 215/396 |
| 5,535,908 | A * | 7/1996 | Sheu | B65D 21/08 220/4.27 |
| 7,150,369 | B1 * | 12/2006 | Fryar | A61J 9/00 215/11.4 |
| 8,146,758 | B1 * | 4/2012 | Peres | A61J 9/008 215/11.1 |
| 8,376,134 | B1 * | 2/2013 | Underwood | B65D 81/3211 206/221 |
| 8,459,450 | B1 * | 6/2013 | Whitaker | A61J 9/00 215/11.4 |
| 8,672,123 | B1 * | 3/2014 | Vallejo | A61J 9/00 222/153.04 |
| 9,004,301 | B2 * | 4/2015 | Wahlstrom | A61J 1/2093 215/11.4 |
| 9,371,163 | B2 | 6/2016 | Frolin | |
| 9,629,782 | B2 * | 4/2017 | Hayes | A61J 11/002 |
| D799,266 | S * | 10/2017 | Schroedter | D7/532 |
| 9,918,592 | B2 * | 3/2018 | Shafee | A47J 47/14 |
| 10,321,779 | B1 * | 6/2019 | Thai | A47G 23/06 |
| 10,542,744 | B2 * | 1/2020 | Ally | A01N 1/0268 |
| 10,881,186 | B2 * | 1/2021 | Steele | A45D 33/20 |
| 11,877,985 | B2 * | 1/2024 | White | A61J 1/2093 |
| 2004/0129600 | A1 * | 7/2004 | Gueret | B65D 81/3205 206/823 |
| 2004/0188371 | A1 * | 9/2004 | Holley, Jr. | A61J 9/001 215/11.1 |
| 2006/0226035 | A1 * | 10/2006 | Smith | B65D 25/08 206/219 |
| 2006/0254936 | A1 * | 11/2006 | Corbitt | B65D 81/3211 206/219 |
| 2007/0017890 | A1 * | 1/2007 | Al-Jadh | A61J 9/00 215/11.1 |
| 2009/0178940 | A1 * | 7/2009 | Said | A61J 9/00 215/11.1 |
| 2010/0213156 | A1 * | 8/2010 | Belnap | A61J 9/00 215/11.1 |
| 2010/0276429 | A1 * | 11/2010 | Fontana | B65D 51/2892 220/502 |
| 2011/0068080 | A1 * | 3/2011 | Weissich | A61J 9/00 215/387 |
| 2011/0290805 | A1 * | 12/2011 | Rances | B65D 81/3205 220/529 |
| 2012/0024812 | A1 | 2/2012 | Underwood | |
| 2012/0055935 | A1 * | 3/2012 | Peres | B65D 81/3211 220/502 |
| 2012/0067875 | A1 * | 3/2012 | Chiang | A61J 9/00 62/3.1 |
| 2012/0193317 | A1 * | 8/2012 | Brown | A61J 9/00 215/6 |
| 2012/0305514 | A1 * | 12/2012 | Harris | A61J 9/00 215/11.1 |
| 2013/0037506 | A1 * | 2/2013 | Wahlstrom | A61J 1/2093 215/6 |
| 2015/0266628 | A1 * | 9/2015 | Worthington | B65D 35/22 222/144.5 |
| 2015/0284167 | A1 * | 10/2015 | Gillett | B65D 25/08 206/221 |
| 2016/0029846 | A1 * | 2/2016 | Zickler | A47J 43/27 206/219 |
| 2018/0368623 | A1 * | 12/2018 | Cerasani | B65D 51/24 |
| 2019/0298611 | A1 * | 10/2019 | Naygauz | A61M 5/1782 |
| 2019/0322425 | A1 * | 10/2019 | Beery | B65D 41/04 |
| 2019/0350396 | A1 * | 11/2019 | Steele | B65D 25/2826 |
| 2020/0178713 | A1 * | 6/2020 | Sorensen | B65D 41/04 |
| 2020/0307893 | A1 * | 10/2020 | Staus | B65D 81/3255 |
| 2021/0085566 | A1 * | 3/2021 | Keenan | B01F 21/15 |
| 2022/0388753 | A1 * | 12/2022 | Jaramillo | B65D 81/3211 |
| 2023/0271766 | A1 * | 8/2023 | Antico | A61J 11/008 215/11.1 |
| 2023/0331457 | A1 * | 10/2023 | Cantu | B65D 81/325 |

* cited by examiner

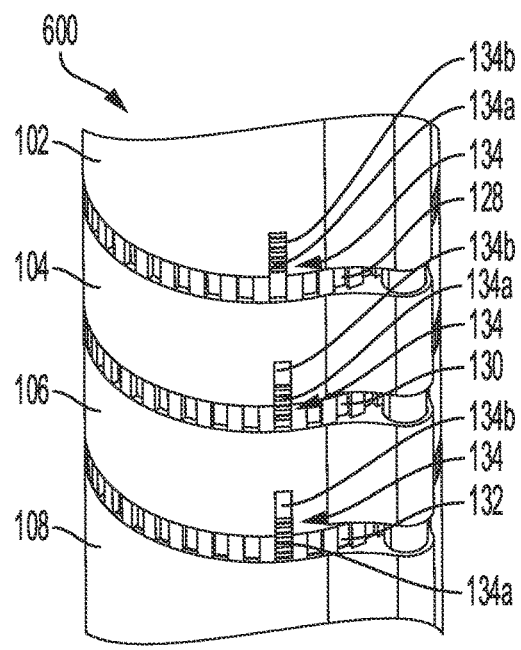
FIG. 6
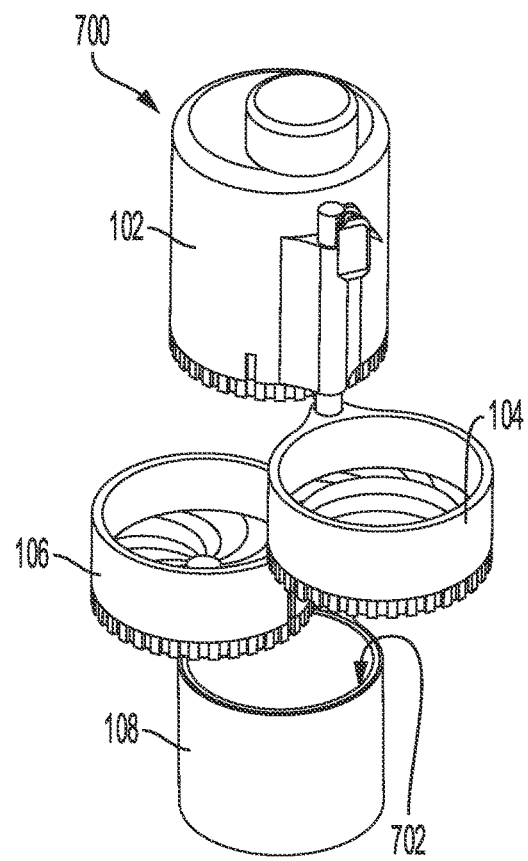
FIG. 7
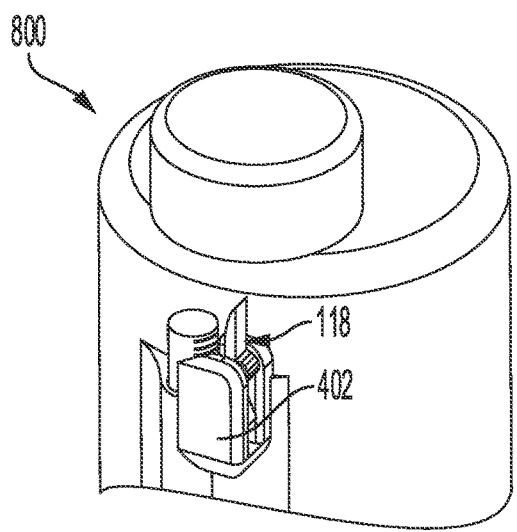
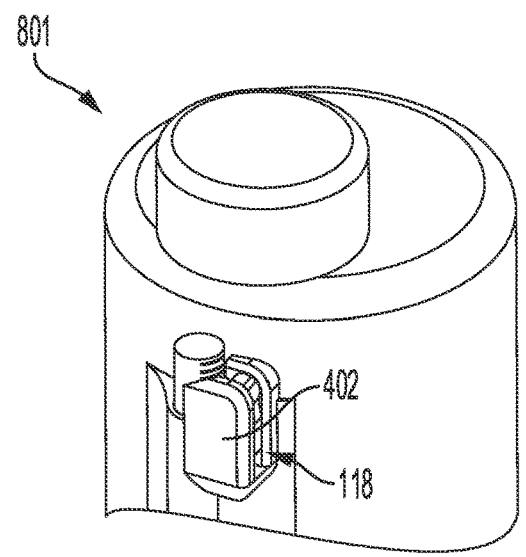
FIG. 8

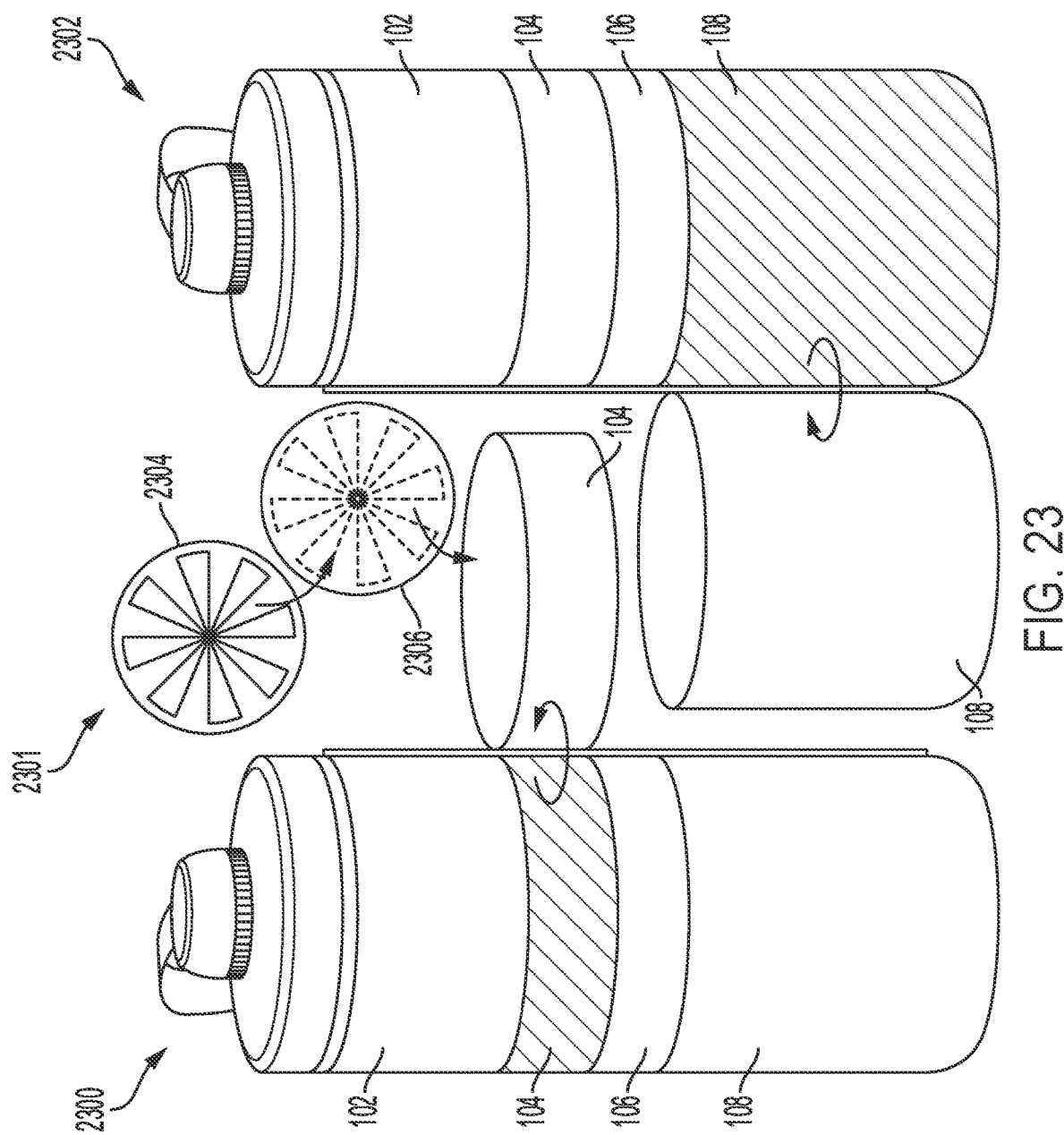

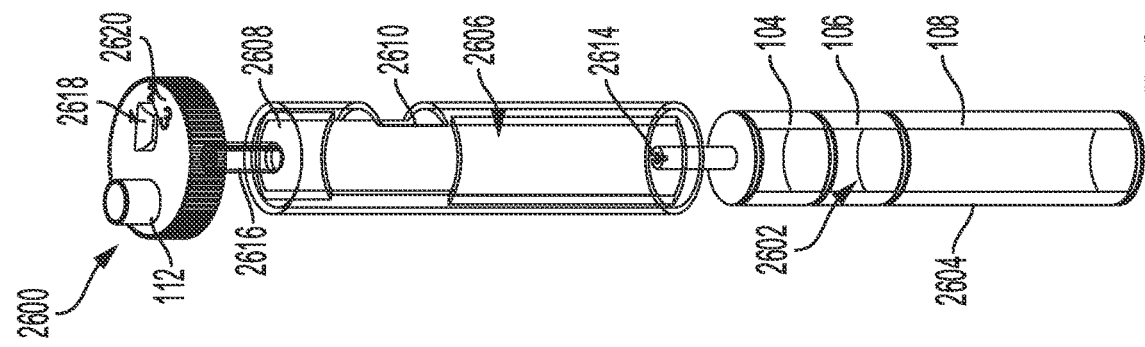
FIG. 26
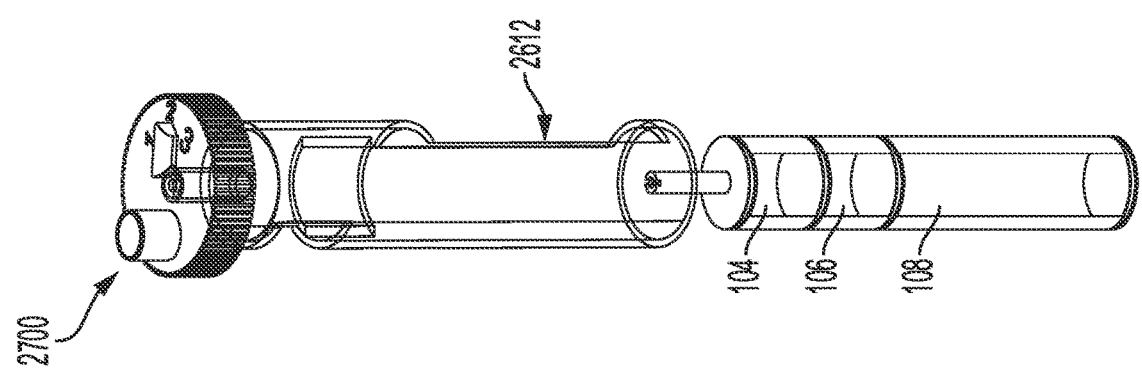
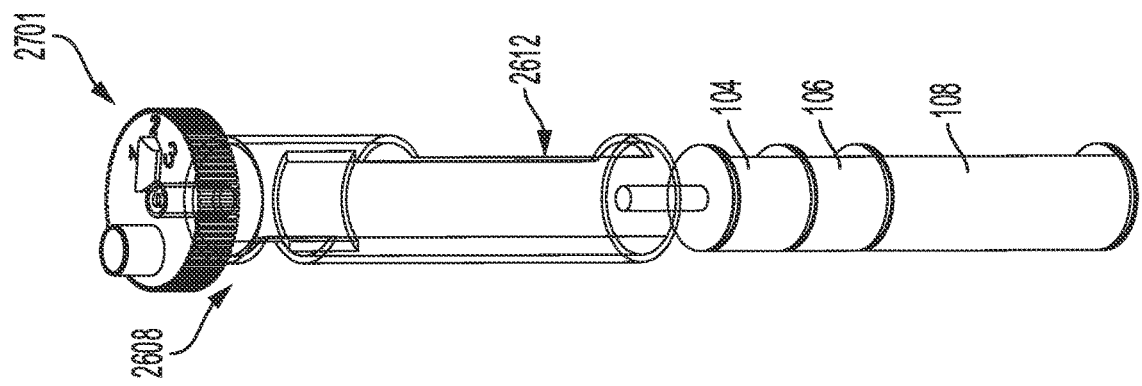
FIG. 27

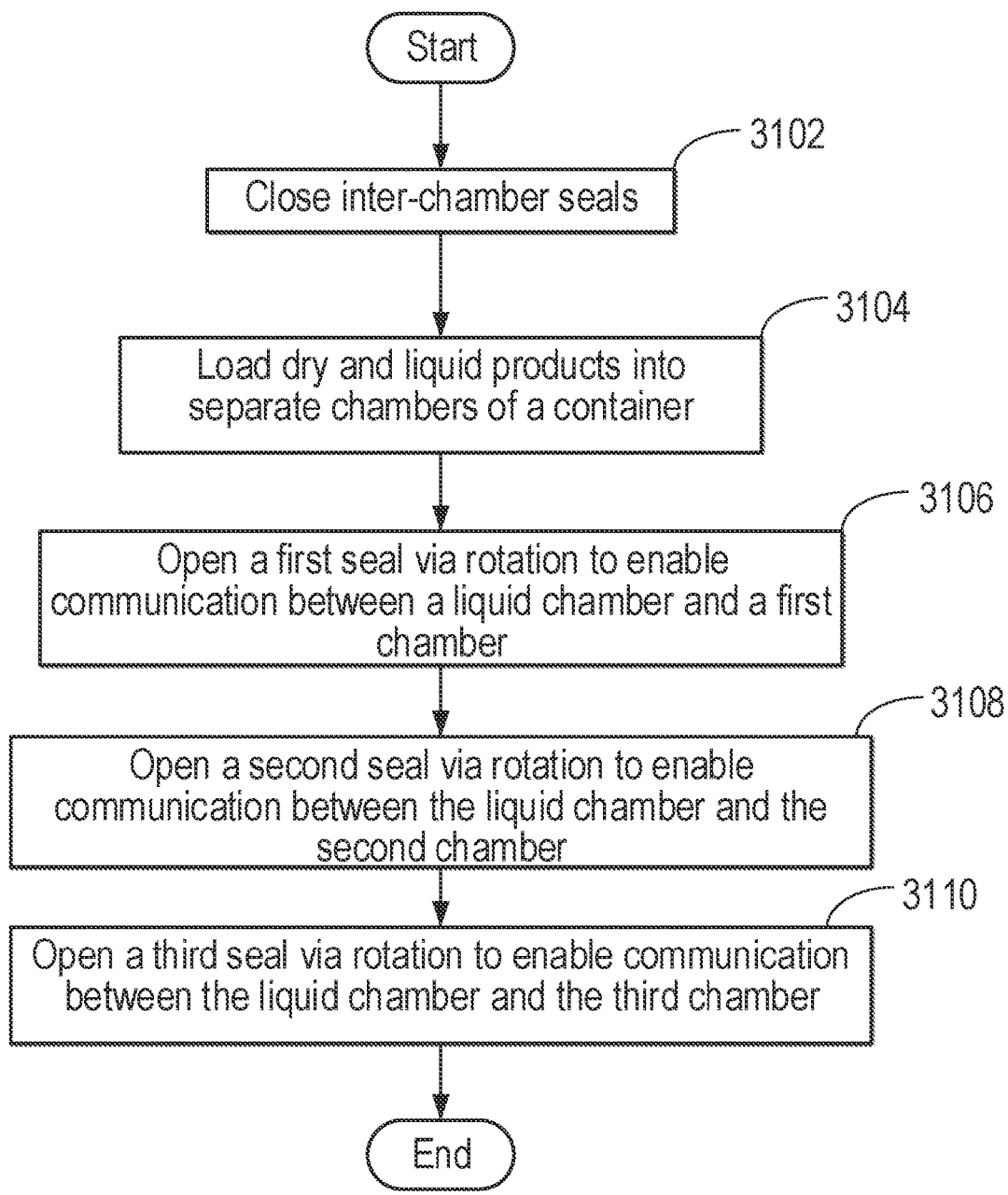

MULTI-CHAMBER CONTAINER AND METHODS

FIELD

The present description relates generally to a multi-chamber container and methods.

BACKGROUND/SUMMARY

Drinking bottles, shaker bottles and other drink containers designed for sports and health enthusiasts require the manual introduction of powdered supplements such as protein powders, hydration salts, pre-workout powders, etc. via opening and closing of a particular powder's container lid, scooping the powder, and manually placing the desired powder amount into an open bottle. For correct mixing, bottles such as shaker bottles use a separate mechanical agitator to break down the powders and allow the supplements to dissolve entirely. Individuals that use these supplements and shaker devices need to separately carry their supplement powders (which often are stored in bulky containers, sealable bags, etc.) and drinking containers (which often include an independent shaker device or ball) to and from the gym, work, or school, to make use of their chosen regimen. Such a need to carry multiple containers can be a burden to the user and take up a large amount of space.

Moreover, supplements vary in their powder quantity per serving and in the amount of fluid (e.g., a liquid such as water) required to dissolve the supplement to provide the desired concentration of solution. As such, different volumes of fluid are required to accommodate proper blending of these supplements. Additionally, agitation devices may be needed to avoid clumping and ensure that the supplements being mixed with the fluid are fully dissolved.

Further still, supplements may need to be taken at different points in time relative to a workout. For example, a first supplement may be desirable prior to a workout, a second supplement may be most effective during a workout, and a third supplement may be most effective after a workout. Thus, due to the various ratios of fluid to supplement required and the potential of supplements needing to be taken at different points in time relative to a workout, a user may not be able to simply pre-mix multiple supplements together for use. Rather, these supplements must be maintained separate from one another.

Previous approaches for addressing the above problems additionally include supplement storage bottles that have external storage compartments for supplements. These supplement storage bottles with external storage compartments for supplements carry multiple supplement powders. For example, in such approaches, the storage containers and compartments are stacked below or above a fluid containing section of a drinking bottle in separate structures external to the fluid containing section.

However, such separate storage of the supplements requires several steps for use. For example, a user needs to remove the supplement storage container from the bottle, open a lid to the fluid containing section of the bottle, open a lid of the supplement storage container, add powder from the supplement storage container to the fluid containing section of the bottle, add a shaking device or ball to the fluid containing section of the bottle, and then close the bottle to use. These several steps result in use of the bottle being inefficient time-wise and an inefficient use of space. The external compartment solution further sacrifices liquid volume in order to accommodate the external compartments and retain a predetermined external dimension. The ability to store multiple supplements externally via external compartments to accommodate hydration, energy, and protein powders results in a large dimensioned bottle without the added equivalent gain in fluid volume. Moreover, one unexpected problem with the external compartment bottles is that the storage compartments are relatively close to the same diameter as the bottle itself. This makes the transfer of the powder from the compartment to the bottle challenging as powder supplements can spill outside of the diameter of the bottle with greater ease due to having no width variability with the fluid vessel thereby creating a loss in the powdered volume delivered and the subsequent concentration of solution.

Other previous approaches to address the above problems include supplement storage within the fluid containing section of the drinking bottle itself. For example, some previous approaches include a bottle that has a supplement storage container comprising a single chamber or container located inside a lid of the bottle to which supplements are added. In such designs, a shaker ball or other independent shaking device may serve as a locking mechanism for the supplement storage container and a fluid containing section containing a fluid such as water. When the user wants to use the supplement in such configurations, the user depresses a button that drops the shaker ball and supplement into the fluid containing section, where the fluid containing section is positioned below the supplement storage container. Further approaches may have a similar supplement storage container and shaking device configuration positioned at a bottom of the bottle instead of at a top of the bottle. For example, one powdered supplement may be stored inside a bottle and use the same supplement storage container and independent shaking device mechanism described above, except the powder container and shaker ball/lock are located at the base of the bottle rather than in the lid above.

However, only one supplement mixture may be used in the internal compartment solutions. Thus, users are only able to store one supplement at a time and those who consume multiple supplements are not able to benefit from the use of these bottle. Users further are not able to utilize a proper fluid to supplement ratio in a case where multiple supplements with different ratio requirements are users, and users are unable to use different supplements at different time points relative to a workout in such approaches. Moreover, these approaches are prone to leaking.

As discussed above, for supplement and liquid capacity, depending on the supplements used, the need for fluid capacity changes as well as the storage compartment size. Supplement and shaker bottles have a typical capacity of 24 ounces of liquid volume or less. This may be sufficient volume to use hydration and energy supplements, but not enough fluid volume to dissolve protein powders adequately. Currently, manufacturers have a range of bottles with various fluid volumes from 45 ounces to 32, and 28 ounce versions and smaller. The available fluid volume is reduced in bottles designed to accommodate external storage compartments due to the desire to keep the external dimensions of the bottles intact as compared to non-storage type bottles.

For usability, previous approaches require users to manually remove a storage container and open a lid to add each supplement to a fluid container of the bottle if more than one supplement is needed or desired for a specific exercise regimen. In some examples, bottle bodies (a fluid container of a bottle) may be able to store one powder therein. However, as mentioned above, such approaches may be inefficient for a user to use from both a time and a space perspective. Furthermore, such approaches often come at the expense of reducing an amount of fluid that can be held by the container in order to maintain the external dimensions of the container compact.

As to previous approaches which include an independent agitator device such as a ball, there are several shortcomings. For example, one shortcoming is the probability of losing the part during washing, in kitchens, sinks, drawers, dishwashers, etc. Secondly, the independent agitator device such as a ball affects the volume of fluid available and changes the specific gravity of the fluid mixture which can result in supplements such as proteins not mixing well or clumping onto the independent agitator device. Adding to the issue of insufficient blending, the majority of shaker bottles on the market do not possess enough volume to accommodate a typical protein shake. As a result, protein shakes do not completely blend and end up with large clumps of supplement suspended in the fluid. For blending efficiency, some previous approaches do not include an agitator ball or independent shaking device and instead attach a fixed agitator apparatus to an underside of the lid, thereby eliminating the need for an independent shaking device or ball.

In one example, the issues described above may be addressed by a container and methods thereof, the container comprising a first chamber positioned between a liquid chamber and a second chamber, a first seal positioned between the first chamber and the liquid chamber, and a second seal positioned between the second chamber and the first chamber. In this way, multiple supplements may be stored in a simple and compact manner which allows for efficient transportation and use. In particular, the container disclosed herein solves the above problems of enabling the storage of multiple powders and supplements into the same space as a liquid containing portion of the container. Moreover, the container described herein eliminates the need for an independent shaker device and streamlines a powdered supplement ingestion process via features which fit within a single drinking container with no independent shaker device or ball.

As one example, a shaft may be included that connects the liquid chamber, first chamber, and second chamber to one another, where the liquid chamber, the first chamber, and the second chamber are independently rotatable about the shaft. Such features may help to avoid separate pieces which may be lost or forgotten by users. Moreover, via the chambers being independently rotatable about the shaft, individual access to the chambers may be easily achieved for filling the chambers with supplements, for example. In at least one example, a size and number of chambers may be varied to address the above-discussed challenges as to proper supplement to liquid ratios. Further, the issues described above may further be addressed via methods which include rotating a first external ring to open a first liquid tight seal, the first liquid tight seal at an end of the liquid chamber opposite an end of the liquid chamber that includes a drinking opening. In this way, a user may easily maintain separation between supplements stored in the first chamber and liquid stored in the liquid chamber and easily mix the supplements and the liquid together when desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a view of a sixth example container, according to one or more examples of the present disclosure.

FIG. 7 shows a view of a seventh example container, according to one or more examples of the present disclosure.

FIG. 8 shows a view of an eighth example container, according to one or more examples of the present disclosure.

FIG. 23 shows a view of a twenty-third example container, according to one or more examples of the present disclosure.

FIG. 26 shows a view of a twenty-sixth example container, according to one or more examples of the present disclosure.

FIG. 27 shows a view of a twenty-seventh example container, according to one or more examples of the present disclosure.

FIG. 31 shows a method flow chart, according to one or more examples of the present disclosure.

FIGS. 1-30 are shown approximately to scale

DETAILED DESCRIPTION

Figure 25:
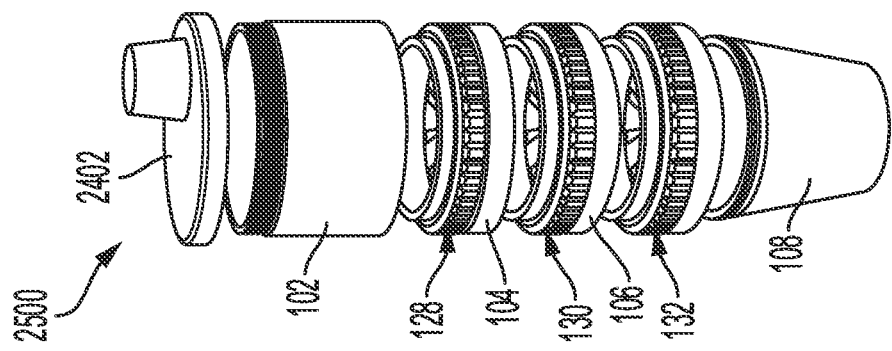
FIG. 25 shows a view of a twenty-fifth example container, according to one or more examples of the present disclosure.
Figure 24:
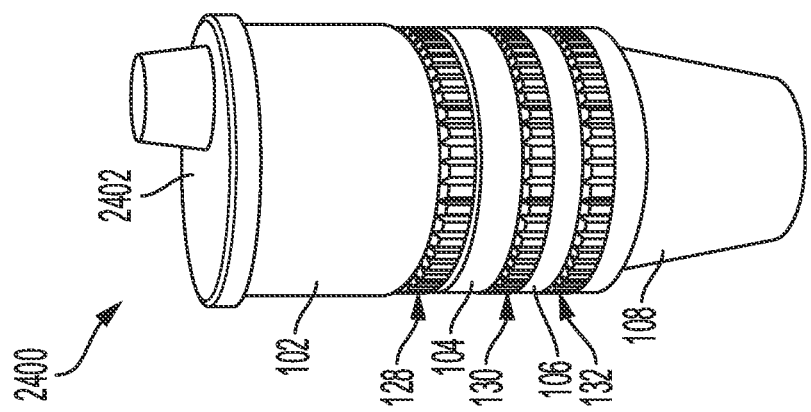
FIG. 24 shows a view of a twenty-fourth example container, according to one or more examples of the present disclosure.
Figures 28, 29, 30:
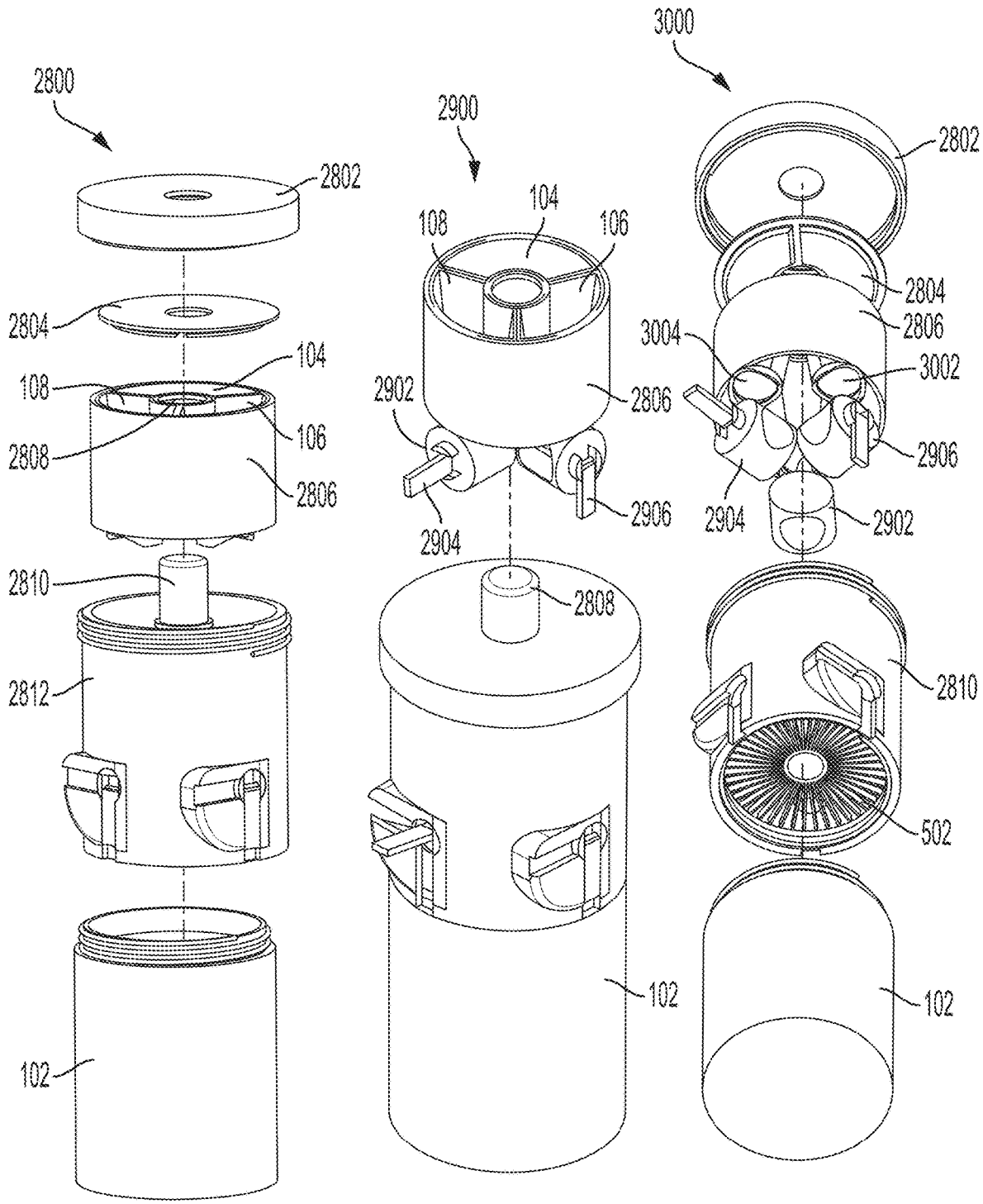
FIG. 28 shows a view of a twenty-eighth example container, according to one or more examples of the present disclosure.
FIG. 29 shows a view of a twenty-ninth example container, according to one or more examples of the present disclosure.
FIG. 30 shows a view of a thirtieth example container, according to one or more examples of the present disclosure.

The following description relates to a multi-chamber container and methods. Via the multi-chamber container and methods discloses herein, convenient and efficient storage and use of liquid and liquid-mixable powder supplements from within a single bottle may be achieve, where these powder supplements may be exercise supplements. As discussed at method example FIG. 31, the containers disclosed herein may include a plurality of chambers that are separated by dividers, where the dividers between the chambers may be opened and closed via rotation to mix various products loaded into the chambers. At least one of the chambers may be a liquid chamber, while remaining chambers may be for the storage of separate powdered supplements or other dry products. Thus, the dividers separating the chambers may be liquid tight. As seen in FIGS. 1-22, the dividers may be seals made of a flexible material framed with spokes, where these seals are opened and closed via rotation of external rings of the container that are coupled to the spokes. As also shown in FIGS. 1-22, a positioning of the chambers may be rotated about a shaft and locked via alignment mechanism and a switch. The ability to position the chambers about a shaft advantageously keeps the chambers together in a single unit while allowing positioning adjustments for purposes of loading the chambers. The locking of the container via the switch and the alignment mechanism may beneficially help to prevent leaks. In at least one example, the dividers may be rotatable disks that are rotated relative to one another to adjust an alignment of openings in the disks, as shown in FIGS. 23-25. When the openings are aligned, the disks allow communication of the chambers between which they are positioned. When the openings are offset, the disks prevent communication of the chambers between which they are positioned. The chambers may be directly coupled to one another via threaded rings, as also shown at FIGS. 23-25. In one or more examples, the dividers may include a nested cylindrical structure configuration, as shown at FIGS. 26-27. In this nested cylindrical structure configuration, a first cylindrical structure is positioned within a second cylindrical structure, and the first and second cylindrical assembly is positioned within a liquid chamber. The first cylindrical structure comprises a plurality of chambers for storing products such as powdered supplements. The second cylindrical structure comprises openings which are configured to only be able to expose one chamber of the first cylindrical structure at a time. Thus, in this nested cylindrical structure configuration, the first and second cylindrical structure may be rotated relative to one another to expose one chamber at a time to the liquid chamber within which the assembly is positioned. In one or more examples, the dividers may be opened and closed via a valve configuration, as shown at FIGS. 28-30. In such valve configurations, each chamber may have a corresponding valve and valve switch. By rotating a valve switch, the corresponding chamber may be transitioned into and out of communication with a liquid chamber positioned therebelow.

FIGS. 1-30 show example configurations with relative positioning of the various components. It is noted that the example multi-chamber containers described are portable and handheld in size. If elements in FIGS. 1-30 are shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Common features and/or configurations may be shared in the various examples provided in FIGS. 1-31. Therefore, for purposes of discussion, FIGS. 1-31 will be described collectively, with common elements being labeled similarly and not being reintroduced.

Figure 1:
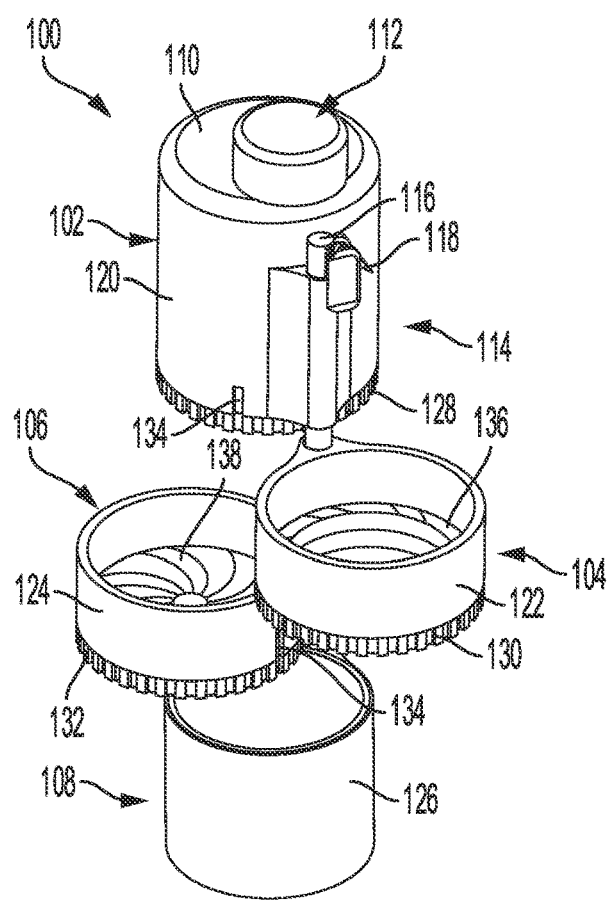
FIG. 1 shows a view of a first example container, according to one or more examples of the present disclosure.

Turning to FIG. 1, FIG. 1 shows a first view of a first example container 100 comprising multiple chambers, including a liquid chamber 102, a first chamber 104, a second chamber 106, and a third chamber 108. In at least one example, the first chamber 104, the second chamber 106, and the third chamber 108 may be used to store powdered supplements. The liquid chamber 102 may be used to store water or other suitable liquids.

A top surface 110 and an access point 112 of the liquid chamber 102 form a top surface of the first example container 100. It is noted that access point 112 is shown with a lid positioned thereon in FIG. 1 and that access point 112 includes both the lid 112a and opening 112b illustrated in FIG. 9 or FIGS. 17-21, in at least one example. The opening 112b is a drinking opening for a user. The sidewall of the first example container 100 comprises liquid chamber sidewall 120, first chamber sidewall 122, second chamber sidewall 124, and third chamber sidewall 126, as well as locking mechanism 114, first external ring 128, second external ring 130, and third external ring 132.

Locking mechanism 114 of the first example container 100 includes shaft 116, switch 118, and alignment mechanism 134, where the locking mechanism 114 extends from access point 112 to the first chamber 104, and where the locking mechanism 114 is on a same side of the container as access point 112. The shaft 116 of the locking mechanism may further extend to the second chamber 106, and the third chamber 108. Switch 118 is in an unlocked position in FIG. 1, which permits rotation of shaft 116 to adjust a positioning of the chambers about shaft 116. Shaft 116 of locking mechanism 114 extends in a direction parallel to a longitudinal axis (see shaft longitudinal axis 202 at FIG. 2) of the first example container 100. Shaft 116 of the first example container 100 is positioned within a shaft receiving opening (see shaft receiving opening 302 at FIG. 3) included in each of the liquid chamber 102, the first chamber 104, the second chamber 106, and the third chamber 108. In this way, the shaft 116 couples the liquid chamber 102, the first chamber 104, the second chamber 106, and the third chamber 108 to one another.

At least one of the chambers of liquid chamber 102, first chamber 104, second chamber 106, and third chamber 108 may be independently rotated about shaft 116. In at least one example, each of the chambers may be independently rotated about shaft 116. That is, each of liquid chamber 102, first chamber 104, second chamber 106, and third chamber 108 may be rotated about shaft 116 individually. In one or more examples, however, it is also possible that one or both of liquid chamber 102 and the third chamber 108 have a fixed position relative to shaft 116 and that only first chamber 104 and second chamber 106 are able to be pivoted independently about shaft 116. Or, in at least one example, only one of the chambers may be rotated about shaft 116.

Via a coupling in which at least one of the chambers is rotatable about shaft 116, improved accessibility to the chambers may be achieved to improve overall efficiency in using the first example container. For example, as shown in FIG. 1, first chamber 104, second chamber 106, and third chamber 108 are all accessible due to a position of the first chamber 104 and the second chamber 106. In particular, first chamber 104 and second chamber 106 have been independently rotated about shaft 116 so that the first chamber 104 and the second chamber 106 are positioned offset from the liquid chamber 102 and the third chamber 108. The first chamber 104 and the second chamber 106 are further offset from one another. Such exemplary positioning as shown in FIG. 1 thus enables easy access to all of chambers. It is noted that a positioning of the chambers relative to one another may be adjusted as desired about the shaft 116.

Looking to first chamber 104, second seal 136 is positioned between first chamber 104 and second chamber 106 is in an open position. It is noted that a first seal similar to second seal 136 is positioned between first chamber 104 and liquid chamber 102 at first external ring 128, though not shown in the view at FIG. 1. Such a first seal may be seen at FIG. 5. The features described in relation to second seal 136 also apply to all other seals of the container, including first seal (such as the first seal 508 shown in FIG. 5) and third seal 138.

Second seal 136 comprises a flexible and liquid tight material, such as rubber or silicon. In an open position, second seal 136 enables fluidic communication between first chamber 104 and second chamber 106. Second seal 136 may be transitioned between the open position shown in FIG. 1, and a closed position, where the closed position of second seal 136 is similar to the position of third seal 138 in FIG. 1. Reference one of the first seal, second seal 136, and third seal 138 being in a closed position refers to fully closed, such that a liquid seal is formed. Reference to one of the first seal, second seal 136, and third seal 138 being in an open position refers to a position in which liquids may move past the seal. That is, in the open position, an opening such as opening 304 shown at a partial view of third example container 300 in FIG. 3, formed by the seal.

Second seal 136 may be transitioned between an open position and a closed position via rotation of second external ring 130. As the second external ring 130 is rotated, a plurality of spokes of the second seal 136 and a material of the second seal 136 are drawn in close to one another until in a closed position. In the closed position, a liquid tight seal is formed and the second seal 136 fully extends across the first example container to cover an area of the first example container 100 at the position of second external ring 130. The inclusion of such spokes in the flexible material seals advantageously helps to provide a stronger seal and seals in a more efficient manner (with less twisting) compared to previous approaches such as by Frolin in U.S. Pat. No. 9,371,163. Therein, flexible material seals are formed by twisting the material until a seal is formed. However, these seals do not include spokes as in the approach herein to assist in forming a tight seal or to improve an efficiency in forming the seal. Thus, the seal in Frolin would require more twisting than in the subject application and the seal ultimately formed would lack the sealing advantages which the structure from the spokes add.

As may be seen in FIG. 1, second external ring 130 includes a geared-teeth shaping to improve an ability to grip second external ring 130 while rotating the second external ring 130. Similarly, first external ring 128 and third external ring 132 also include geared-teeth shaping for improved gripping. Though a geared-teeth shaping is shown in FIG. 1, other types of shaping to improve an ability of a user to grip the external rings is possible. For example, a dimpled texture, dotted texture, spline shaping, or vertical grooves and ridges may be included to improve gripping of the external rings. Moreover, in at least one example, each of the first external ring 128, second external ring 130, and third external ring 132 may include a lip which extends over a chamber positioned beneath the external ring to help improve sealing between the chambers. Additionally or alternatively, a gasket may be included between the external rings and the chambers to improve sealing. For example, first external ring 128 may be shaped with a lip and/or a gasket which fits with first chamber 104 in order to improve sealing between liquid chamber 102 and first chamber 104 when the first seal at first external ring 128 is open.

As discussed in greater detail herein, second seal 136 comprises a plurality of spokes. The plurality of spokes and the material of second seal 136 (such as rubber or silicon) may be coupled to an inner surface of second external ring 130. That is, a portion of each of the spokes proximal the inner surface of second external ring 130 is coupled to the inner surface of second external ring 130. The plurality of spokes comprises a flexible yet strong material. For example, the spokes may comprise wire or a metal ribbon, for example. The plurality of spokes may be at least slightly biased towards a closed position in which the spokes are pressed against each other. Further, the material of the second seal 136 may be pulled across the plurality of spokes. In this way, when in a closed position, the first seal, second seal 136, and third seal 138 are liquid tight. Therefore, if the first seal is closed, liquid chamber 102 does not communicate with any of first chamber 104, second chamber 106, and third chamber 108. The plurality of spokes may be transitioned from the closed position to an open position to open the second seal 136 by rotating the second external ring 130 to which the plurality of spokes is connected. As the second external ring 130 is adjusted, the ends of the spokes coupled to the inner surface of second external ring 130 are rotated. As the ends of the spokes are rotated, ends of the spokes not coupled to the inner surface of the second external ring 130 are pulled apart to form an opening.

By adjusting the first seal, second seal 136, and third seal 138 between various combinations of open and closed positions, communication between the chambers of the container may be adjusted. Such an ability to adjust communication between the chambers of the container may be especially advantageous in cases where various supplements are of interest for a user. For example, in a case where a user may wish to use supplements a different times, a first supplement may be stored in the first chamber 104, a second supplement may be stored in the second chamber 106, and a third supplement may be stored in the third chamber 108. For example, the first supplement may be a pre-workout supplement, a second supplement may be a supplement for during a workout, and a third supplement may be a post-workout supplement. In other examples, one or more of the first supplement, the second supplement, and the third supplement may be the same supplement, however.

Figure 2:
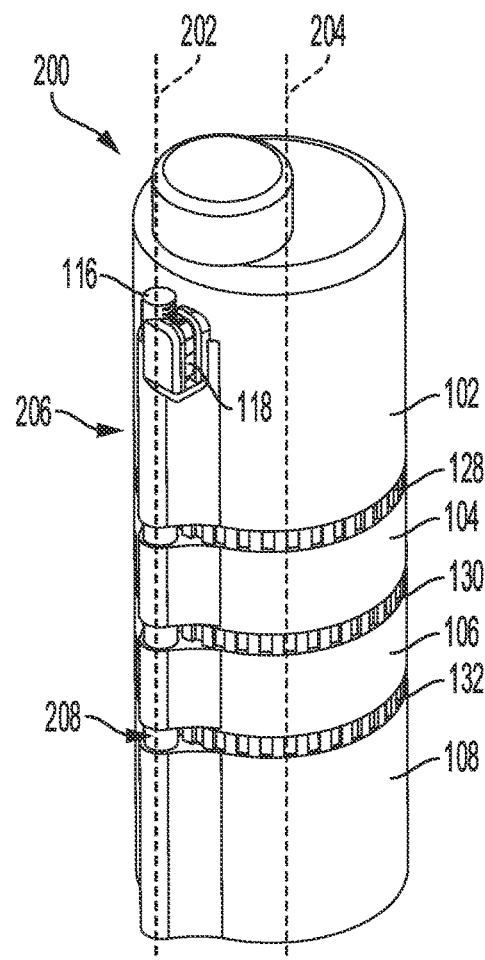
FIG. 2 shows a view of a second example container, according to one or more examples of the present disclosure.
Figure 3:
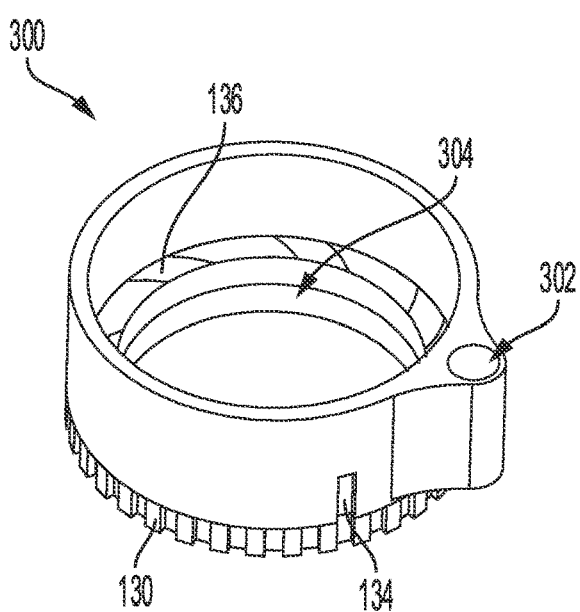
FIG. 3 shows a view of a third example container, according to one or more examples of the present disclosure.

In at least one example, a user may adjust a positioning of the chambers about shaft 116 as shown in FIG. 1. Then, second seal 136 may be transitioned to a closed position via rotation of second external ring 130, and the first supplement may be loaded into first chamber 104. Once the first supplement is loaded into first chamber 104, the second supplement may be loaded into second chamber 106, and the third supplement may be loaded into third chamber 108. The chambers may then all be positioned into alignment, such as shown at FIG. 2. As the first seal, second seal 136, and third seal 138 are all closed, the supplements may be maintained separate from one another. A liquid, such as water, may be loaded into liquid chamber 102 via the opening of access point 112. When it is desired to mix the first supplement, first external ring 128 may be rotated to transition the first seal from a closed position into an open position. By opening the first seal between the liquid chamber 102 and the first chamber 104, the first supplement (such as a pre-workout) supplement may mix with the liquid loaded into the liquid chamber 102.

After consumption of the first supplement and liquid mixture, additional liquid may be added to the liquid chamber 102 and to the first chamber 104 via the opening of access point 112 (after removing the lid positioned thereon), as the first seal is still in an open position. Then, second external ring 130 may be rotated to transition the second seal 136 from the closed position to an open position. For example, to transition the second seal 136 from the closed position to the open position, the second external ring 130 may be rotated in a same direction as the first external ring 128 was rotated to transition the first seal from the closed position into an open position. By opening the second seal 136, the second supplement (such as a supplement for during a workout) in the second chamber 106 may be mixed with the liquid stored in the space defined by liquid chamber 102 and the first chamber 104.

After consumption of the second supplement and liquid mixture, additional liquid may be added to the liquid chamber 102, the first chamber 104, and the second chamber 106 via the opening 112 of access point (after removing the lid positioned thereon), as the first seal and the second seal 136 are in an open position. Then, third external ring 132 may be rotated to transition the third seal 138 from the closed position to an open position. By opening the third seal 138, the third supplement (such as a supplement for after a workout) in the third chamber 108 may be mixed with the liquid in the space defined by the liquid chamber 102, first chamber 104, and second chamber 106. In at least one example, as illustrated in FIG. 1, third chamber 108 may hold a larger volume than the first chamber 104 and the second chamber 106. This is because post workout supplements such as protein shakes are often a greater value than other supplements. Moreover, post workout supplements (particularly protein shakes) require more liquid volume than typical supplements used before and during workouts. Thus, the positioning as shown in FIG. 1 of third chamber 108 to be positioned below liquid chamber 102, first chamber 104, and second chamber 106, is further advantageous as to ensuring increased capacity for liquid to ensure proper mixing.

Turning now to FIG. 2, FIG. 2 shows a view of a second example container 200 in an aligned position. In one or more examples, second example container 200 may be first example container 100 in a second position. For example, the chambers of second example container 200 may be rotated about shaft 116 to transition from first example container 100 to second example container 200. Switch 118 is in a locked position in FIG. 2, thus preventing shaft 116 from rotating in the second example container 200 shown in FIG. 2. As such, a positioning of the chambers of the second example container 200 (liquid chamber 102, first chamber 104, second chamber 106, and third chamber 108) are unable to be rotated about the shaft 116. In order to permit such rotation of the chambers about shaft 116, switch 118 must first be transitioned from the locked position shown in FIG. 2 to the unlocked position shown in FIGS. 1 and 4. That is, the switch 118 must be transitioned from a downward extending position which locks shaft 116 to an upward extending position which unlocks shaft 116.

As may be seen in FIG. 2, a shaft longitudinal axis 202 of shaft 116 extends in a direction parallel to a container longitudinal axis 204 of second example container 200. Moreover, a housing 206 of the shaft is shown, where each of the liquid chamber 102, first chamber 104, second chamber 106, and third chamber 108 include a housing 206 for shaft 116 that includes an opening therein such as shaft receiving opening 302 shown in FIG. 3. The housing 206 is a projection which surrounds a circumference of the shaft 116 for a height of the respective chamber. In between chambers, when overlapping with the first external ring 128, second external ring 130, and third external ring 132, shaft 116 is exposed and not retained in a housing. The shaft 116 is thus protected in housing 206 at regions where shaft 116 overlaps with the chambers and is exposed at regions 208 where shaft overlaps with the external rings. In this way, the shaft 116 may be protected from degradation while still allowing for independent movement of the chambers.

Figure 4:
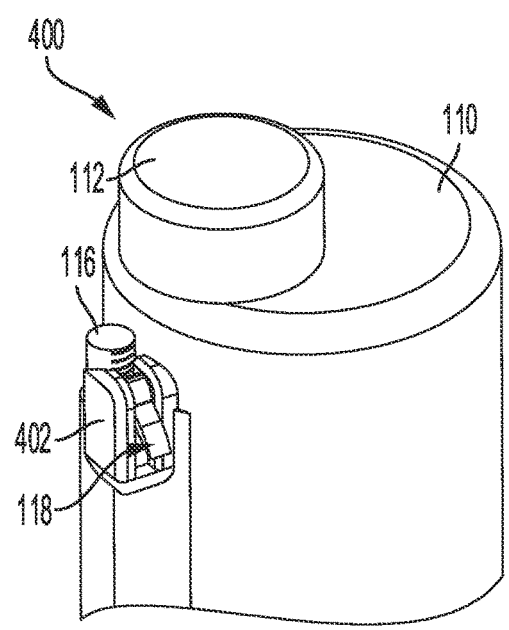
FIG. 4 shows a view of a fourth example container, according to one or more examples of the present disclosure.

Turning now to FIG. 4, a fourth example container 400 is shown. It is noted that the fourth example container 400 may be a partial view of one of the containers shown in FIGS. 1-2. As seen at FIG. 4, switch 118 is housed in a switch housing 402. The switch housing 402 includes a groove in which the switch 118 is held. The groove of switch housing 402 streamlines the switch when in a locked position, such as at FIG. 2. That is, the groove of switch housing 402 helps to keep switch 118 in a position such that switch 118 is not easily caught on objects incidentally.

Figure 5:
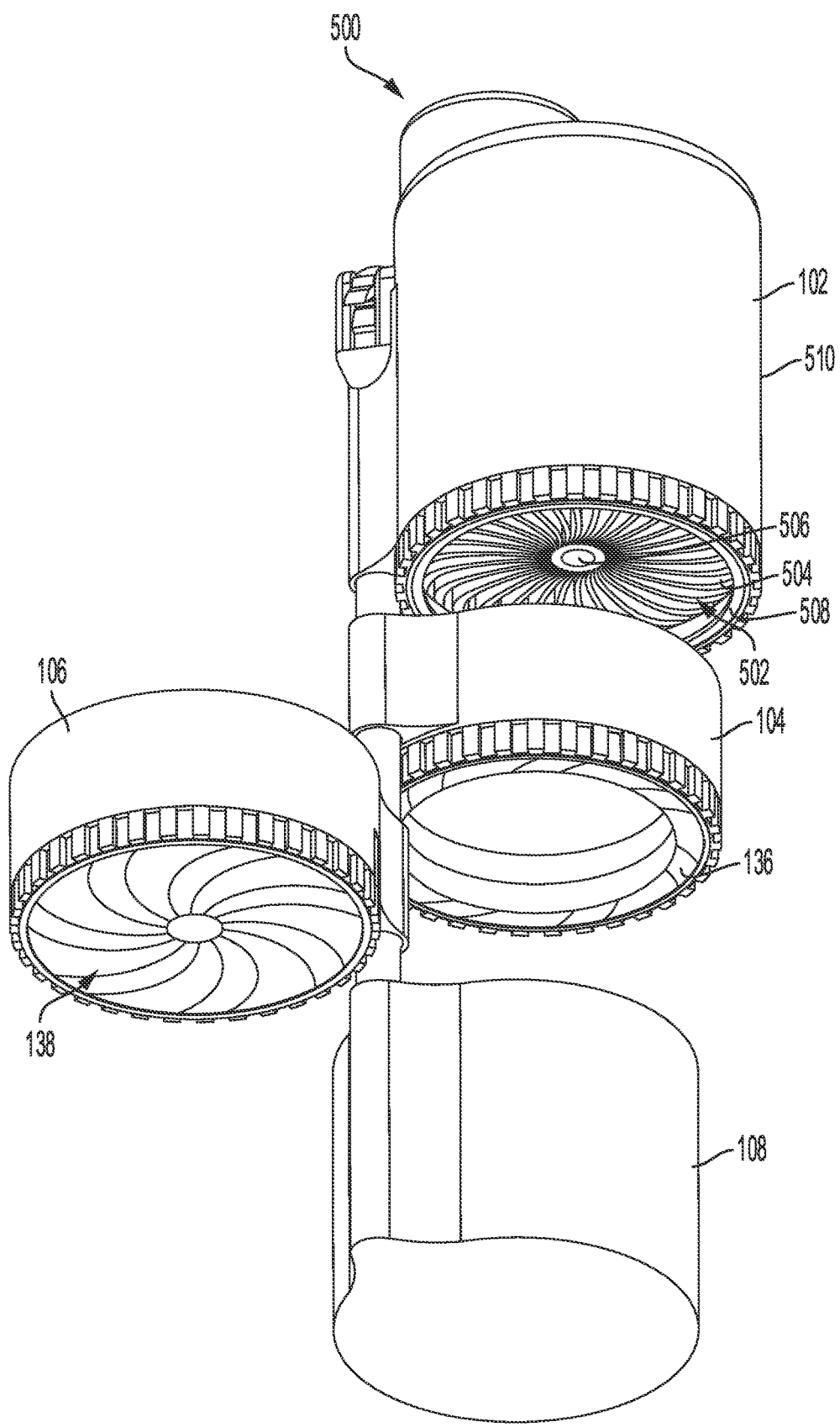
FIG. 5 shows a view of a fifth example container, according to one or more examples of the present disclosure.

Turning to FIG. 5, a fifth example container 500 is shown. It is noted that fifth example container 500 may be an alternative view of one of the containers shown in FIGS. 1-4 in at least one example. As is seen in FIG. 5, a mixing element 502 comprising a spoke 504 and hub 506 configuration is fitted within liquid chamber 102, adjacent first seal 508. In particular, mixing element 502 is positioned immediately above first seal 508. Via such positioning, where the first seal 508 is positioned between the mixing element 502 and first chamber 104, mixing of supplements from any of the first chamber 104, second chamber 106, and third chamber 108 with liquid from the liquid chamber 102 is passed through the mixing element 502 prior to being flowed through the opening of access point 112 formed in the top of liquid chamber 102 for drinking. In this way, technical advantages as to improved mixing are achieved. Further, the drawbacks of independent mixing devices, such as the need for a user to remember to bring such devices, are at least partially addressed.

The hub 506 of the mixing element 502 comprises an opening extending along a container longitudinal axis through the mixing element 502. The spokes 504 of mixing element 502 extend from the hub 506 of mixing element 502 to an inner surface of sidewall 510 of the liquid chamber 102. The openings formed between adjacent spokes 504 enable liquid that may be stored in liquid chamber 102 and supplements that may be stored in the chambers to mix. The inclusion of spokes 504 advantageously prevents clumping of supplements when mixing with liquid in the fifth example container 500. Each of the spokes 504 may be shaped as parallel curved pieces, wherein adjacent spokes of the spokes 504 are spaced apart to form a plurality of openings between the spokes 504. However, alternative shaping of the spokes 504 is possible. For example, each of the spokes 504 may be shaped as straight rods or a zigzag shape among other possibilities that extend from the hub 506 to the inner surface of sidewall 510. Further, additionally or alternatively, materials such as a mesh material may be included in mixing element 502. For example, a mesh or mesh-like material may extend in the openings formed between adjacent spokes, or in at least one example a mesh or mesh-like material may be used as an alternative to the spoke 504 and hub 506 configuration.

Turning now to FIG. 6, FIG. 6 shows a view of a sixth example container 600. In at least one example, sixth example container 600 may be an alternative view of one of the containers shown in FIGS. 1-5.

Sixth example container 600 shows a close-up view of the alignment mechanism 134 included between each chamber and an adjacent external ring. In particular, an alignment mechanism 134 is included between liquid chamber 102 and first external ring 128, between first chamber 104 and second external ring 130, and between second chamber 106 and third external ring 132.

Each alignment mechanism 134 comprises an alignment projection 134a and an alignment notch 134b, where alignment projection 134a fits into alignment notch 134b. Alignment projection 134a may be a substantially rectangular projection, in at least one example. In at least one example, alignment projection 134a may include a gripping surface, so that alignment projection 134a may be easily gripped and slid vertically up and down in a direction parallel to a container longitudinal axis. Alignment notch 134b may be a groove recessed relative to an external surface sidewall of a chamber. For example, looking to liquid chamber 102 at FIG. 6, alignment notch 134b is recessed relative to an external surface of the sidewall of liquid chamber 102. A shaping of the alignment projection 134a may substantially correspond to a shaping of alignment notch 134b in order to allow a friction fit to hold the alignment projection 134a within alignment notch 134b, in at least one example. Additionally or alternatively, a latching mechanism may also be included to hold the alignment projection 134a within alignment notch 134b.

An unlocked position of alignment mechanism 134 may be a position in which alignment projection 134a is fit completely within alignment notch 134b. In particular, alignment projection 134a and alignment notch 134b may be specifically sized so that when a top of alignment projection 134a is positioned against a top of alignment notch 134b, a bottom of alignment projection 134a does not overlap with any external ring of the container. That is, the alignment projection 134a only overlaps a chamber of corresponding alignment notch 134b when the alignment mechanism 134 is in a locked position. Put another way, alignment notch 134b has a first extreme end and a second extreme end, where the first extreme end is closer to the mouth of the water bottle than the second extreme end. When the alignment projection 134a touches the first extreme end of the alignment notch 134b in a first position, the alignment mechanism is unlocked and a corresponding ring may be rotated. When the alignment projection 134a touches the second extreme end of alignment notch 134b in a second position, the corresponding ring is prevented from rotating. When the alignment projection 134a is not in contact with the first or second extreme ends of alignment notch 134b in a third position, then ring is still block from rotating.

For example, liquid chamber 102 in FIG. 6 shows an example where alignment mechanism 134 is in an unlocked position. As may be seen in FIG. 6 at liquid chamber 102, in an unlocked state of alignment mechanism 134, alignment projection 134a is fit into alignment notch 134b. In this unlocked position of alignment mechanism 134, the alignment projection 134a is fully above first external ring 128 and does not overlap first external ring 128. The alignment projection 134a is held within alignment notch 134b via a friction coupling between the alignment projection 134a and the alignment notch 134b, in at least one example.

Looking to first chamber 104 at FIG. 6, alignment mechanism 134 is in a locked position. It is noted that the alignment mechanisms 134 are in a locked position when the alignment projection 134a overlaps with an alignment notch 134b and overlaps with a corresponding external ring. As may be seen at the alignment mechanism 134 of first chamber 104, the alignment projection 134a is partially positioned in a groove formed in second external ring 130 and partially positioned in alignment notch 134b. In at least one example, alignment projection 134a may have been transitioned from an unlocked position (such as shown at liquid chamber 102) to the locked position via sliding of the alignment projection 134a towards the second external ring 130 in a downward direction.

Via such positioning of the alignment projection 134a at first chamber 104, rotation of second external ring 130 is prevented.

Looking to second chamber 106 at FIG. 6, alignment mechanism 134 is in a fully locked state, where a bottom of alignment projection 134a is substantially aligned with a bottom of third external ring 132. That is, in the fully locked state, the alignment mechanisms 134 are partially positioned in alignment notch 134b while the bottom of the alignment projection 134a is substantially aligned with the bottom of a corresponding ring. In the fully locked state of one of the alignment mechanisms, the corresponding external ring is prevented from being rotated. Further, the corresponding chamber is prevented from being rotated about shaft 116. Thus, in the fully locked position of the alignment mechanism 134 as shown at third chamber 108 in FIG. 6, rotation of the third external ring 132 is prevented and rotation of second chamber 106 about shaft 116 is prevented. The fully locked state may be a stronger locked state than the locked state shown at first chamber 104 of FIG. 6, in at least one example. Nonetheless, rotation of corresponding external rings and chambers may be prevented whether in a locked state as shown at first chamber 104 or the fully locked state as shown at second chamber 106.

In at least one example, the alignment mechanisms 134 may be positioned such that the alignment mechanisms 134 may only be in a locked position (including a fully locked position) when a corresponding chamber is in an aligned position. It is noted that such an aligned positioning refers to positioning such as shown at FIG. 2, where an overall aligned chamber formation is created. In at least one example, aligned positioning of each of the chambers results in a liquid tight seal being formed between all of the chambers. Thus, in such cases, by only allowing locking of the alignment mechanisms 134 when the chambers are in an aligned position, the technical effect of preventing leakage is achieved. Moreover, by preventing rotation of the external rings when the alignment mechanisms 134 are in the locked position, an unwanted repositioning of seals may be achieved.

Turning now to FIG. 7, FIG. 7 shows a seventh example container 700. In at least one example, sixth example container 700 may be an alternative view of one of the containers shown in FIGS. 1-6. As may be seen in FIG. 7, a gasket 702 is positioned along a rim of a top edge of third chamber 108. Though gasket 702 is only illustrated along the rim of the top edge of third chamber 108, it is noted that similar gaskets may be included at remaining chambers, including liquid chamber 102, first chamber 104, and second chamber 106. For example, a top rim of one or both of the first chamber 104 and the second chamber 106 may include a gasket positioned therein, similar to third chamber 108. Additionally or alternatively, each of the external rings may include a gasket positioned along an inner rim. Such inclusion of one or more gaskets in these particular positions may achieve the technical effect of preventing leakage.

Turning now to FIG. 8, FIG. 8 shows views of an eighth example container in a first position 800 and the eighth example container in a second position 801. It is noted that the eighth example container at FIG. 8 may be an alternative view of one of the containers shown in FIGS. 1-7 in at least one example.

Looking to the eighth example container in the first position 800, the first position includes switch 118 in an unlocked position. In the unlocked position, the shaft 116 may rotate freely. Thus, chambers of the container may be more easily rotated. As seen in FIG. 8, switch 118 extends in a direction substantially parallel to a container longitudinal axis (see FIG. 2) in the unlocked position. Due to the switch 118 being positioned in the unlocked position, the switch 118 extends outside of housing 402. In particular, the switch 118 extends above housing 402. The switch 118 extending above housing 402 achieves the technical effect of providing a clear indication when the switch 118 is in the unlocked position. That is, the switch 118 positioning in the unlocked state is such that a user's attention may be drawn to the switch 118. This is advantageous, as the user may be alerted that potentially unwanted rotation of the chambers is possible.

Looking to the eighth example container in the second position 801, the second position includes switch 118 in a locked position. In the locked position, chambers of the container may be prevented from easily rotating, as the shaft 116 is prevented from rotating. The ability to prevent rotation of the shaft 116 is particularly advantageous in combination with the alignment mechanism described in detail at FIG. 6, as two sets of locks may be included to prevent unwanted rotation of the chambers. It is noted that the switch 118 is received in a groove of housing 402 when in the locked position in such a manner that the switch 118 is not easily seen. That is, the configuration of the switch 118 in the locked position is not configured to draw a user's attention as to the locked position. Positioning of the switch 118 to fit within the groove of housing 402 provides an indication that enables a switch 118 to be quickly evaluated as in the locked position.

Figure 9:
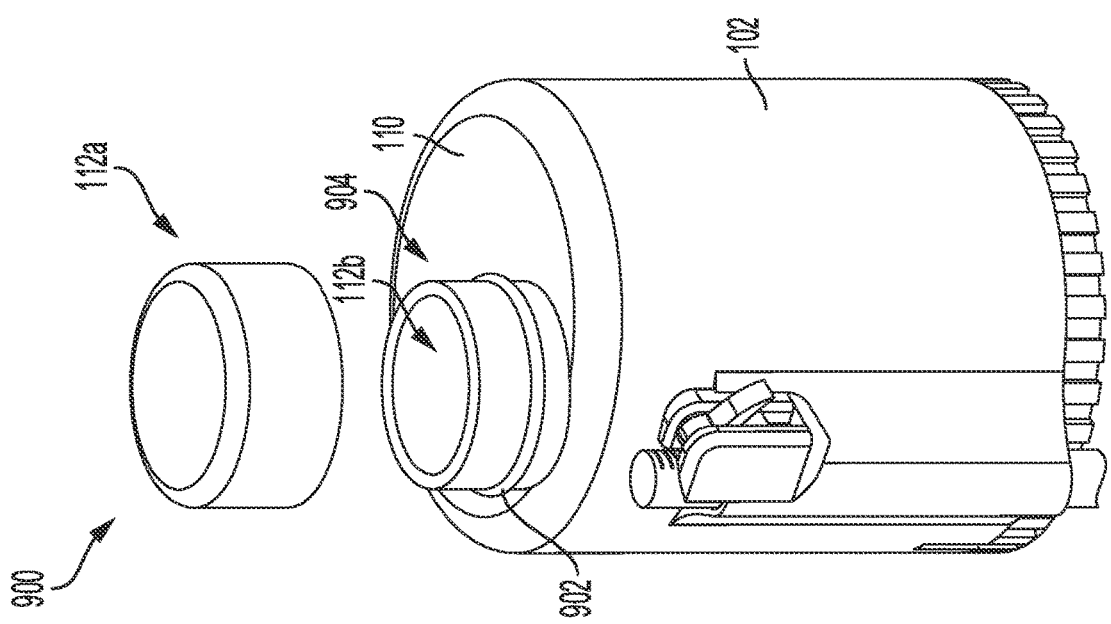
FIG. 9 shows a view of a ninth example container, according to one or more examples of the present disclosure.

Turning now to FIG. 9, FIG. 9 shows a ninth example container 900. It is noted that the ninth example container at FIG. 9 may be an alternative view of one of the containers shown in FIGS. 1-8 in at least one example. In the ninth example container 900, the access point 112 (such as at FIG. 1) is shown with lid 112a removed from the opening 112b of access point 112. The lid 112a may be coupled to a structure defining opening 112 via threading 902. Additionally or alternatively, the lid 112a may be coupled to the opening 112b via a friction fit. In the ninth example container 900, the opening 112b is a drinking opening, where a spout structure 904 defines a portion of the opening 112b. Additionally or alternatively, however, an entire top surface 110 may comprise a lid that is removable to provide access to liquid chamber 102. Or, in at least one example, a straw structure may be utilized rather than a spout structure to define a passage for accessing contents within the liquid chamber 102.

The opening 112b extends through spout structure 904 and through a top surface 110 into the liquid chamber 102. Thus, contents positioned within liquid chamber 102 are accessible via opening 112b.

Figure 10:
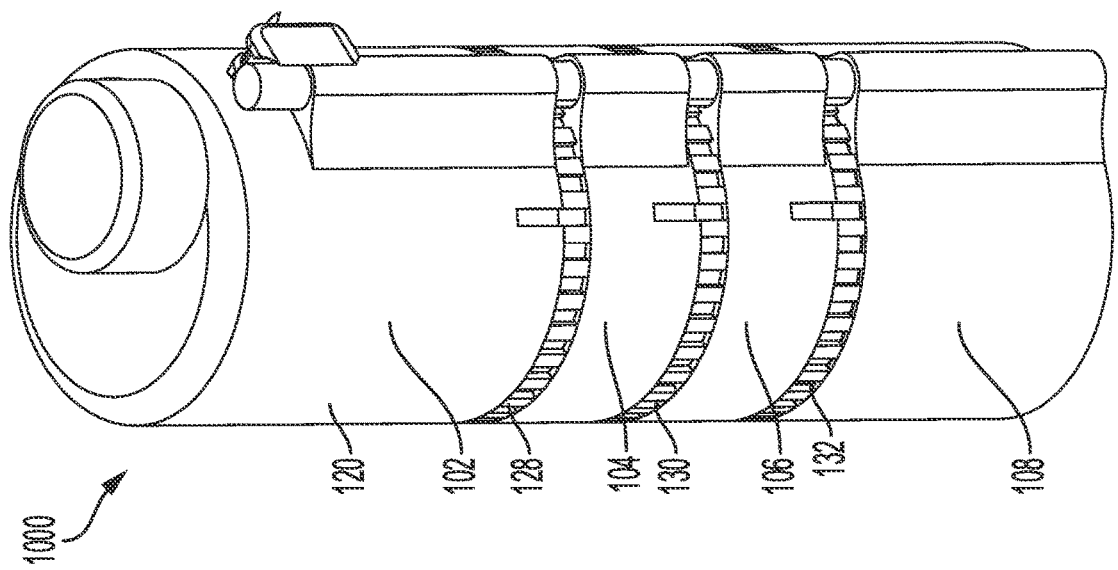
FIG. 10 shows a view of a tenth example container, according to one or more examples of the present disclosure.

Turning to FIG. 10, FIG. 10 shows a tenth example drinking container 1000. It is noted that the tenth example container at FIG. 10 may be an alternative view of one of the containers shown in FIGS. 1-9 in at least one example. The tenth example container 1000 at FIG. 10 is in an aligned chamber formation.

Figure 11:
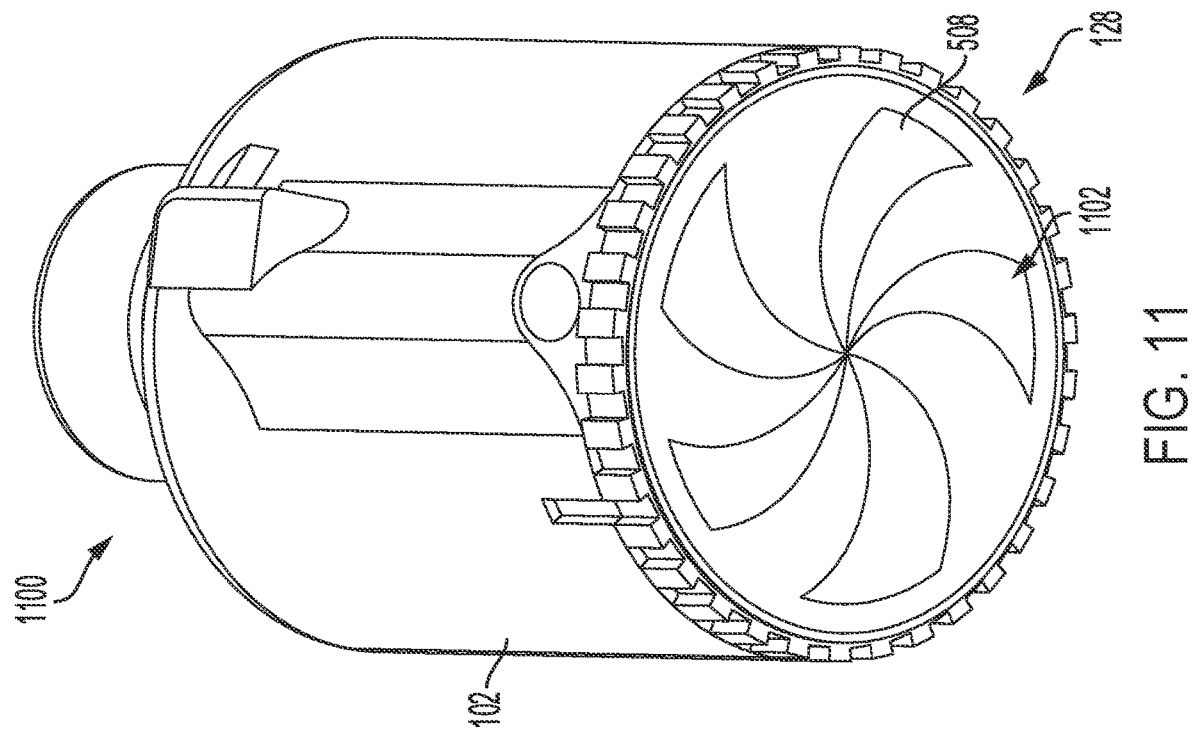
FIG. 11 shows a view of an eleventh example container, according to one or more examples of the present disclosure.

Turning to FIG. 11, FIG. 11 shows an eleventh example drinking container 1100. It is noted that the eleventh example container at FIG. 11 may be an alternative view of one of the containers shown in FIGS. 1-10 in at least one example. Spokes 1102 of first seal 508 are shown in FIG. 11. It is noted that first seal 508 is in a closed position at FIG. 11. As such, in the first seal 508 is shown creating a liquid tight barrier in FIG. 11.

Figure 12:
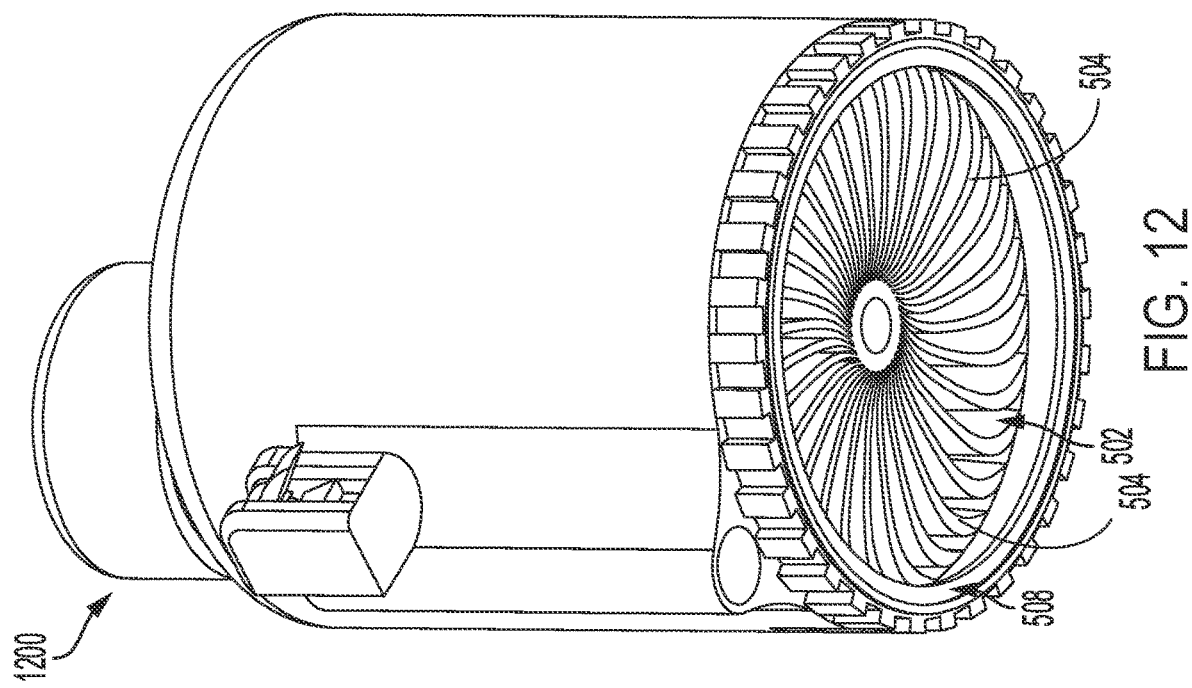
FIG. 12 shows a view of a twelfth example container, according to one or more examples of the present disclosure.

Looking to FIG. 12, FIG. 12 shows a twelfth example drinking container 1200. It is noted that the twelfth example container 1200 at FIG. 12 may be an alternative view of one of the containers shown in FIGS. 1-11 in at least one example. Mixing element 502 is illustrated above first seal 508, where first seal 508 is in an open position.

Figure 13:
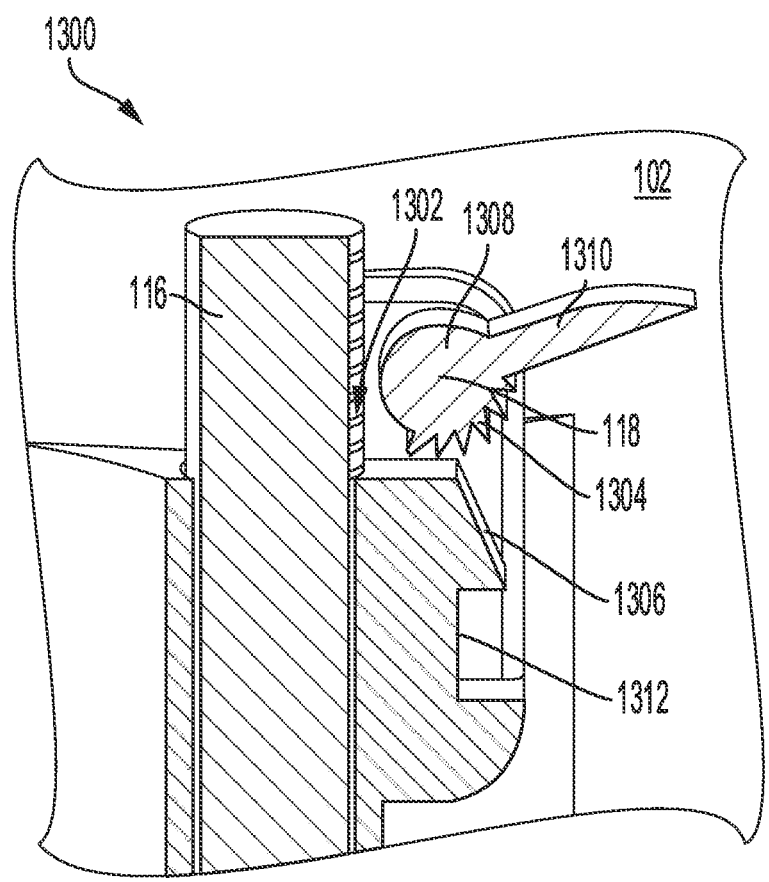
FIG. 13 shows a view of a thirteenth example container, according to one or more examples of the present disclosure.

Turning now to FIG. 13, FIG. 13 shows an example cross-sectional view of a thirteenth example container 1300. It is noted that the thirteenth example container at FIG. 13 may be an alternative view of one of the containers shown in FIGS. 1-12 in at least one example. In particular, the cross-section view at FIG. 13 is of housing 402 and switch 118.

As seen in FIG. 13, switch 118 is in an unlocked position, such that teeth 1304 at a head 1308 of switch 118 are disengaged from teeth receiving grooves 1302 formed into shaft 116. A tail 1310 of switch 118 is extended in such a manner that it is clearly visible beyond the housing. The tail 1310 being clearly visible beyond the housing advantageously acts as a clear indicator to the user that the switch 118, and thus shaft 116, is in an unlocked state. Thus, shaft 118 may be free to rotate at FIG. 13. It is noted that a sloped surface 1306 of the housing allows for switch 118 to be hidden when it is in a locked position. Recess 1312 formed directly below sloped surface 1306 enables a user to more easily move switch 118 from a fully locked to position towards an unlocked position. In particular, recess 1312 provides improved accessibility to tail 1310 when switch is in the locked position, so that a user may move the switch 118 via tail 1310.

Figure 14:
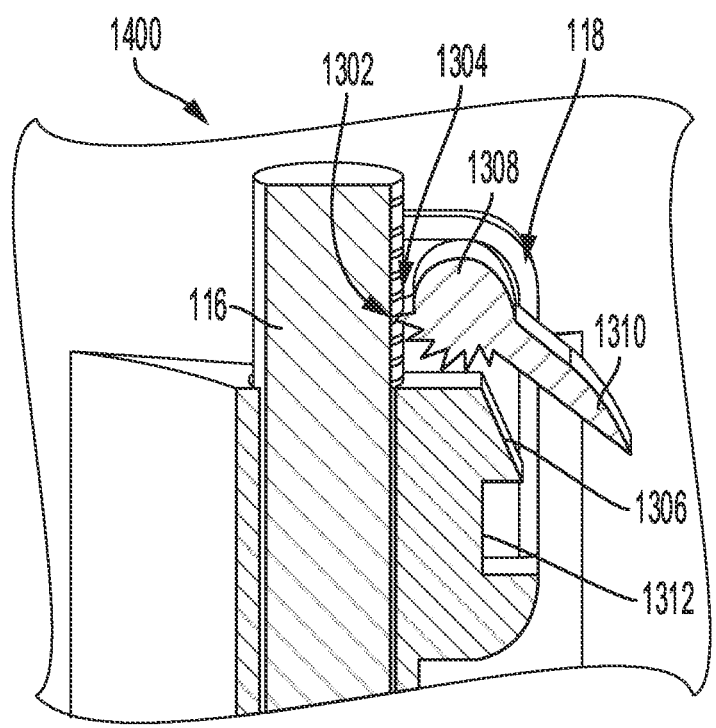
FIG. 14 shows a view of a fourteenth example container, according to one or more examples of the present disclosure.
Figure 15:
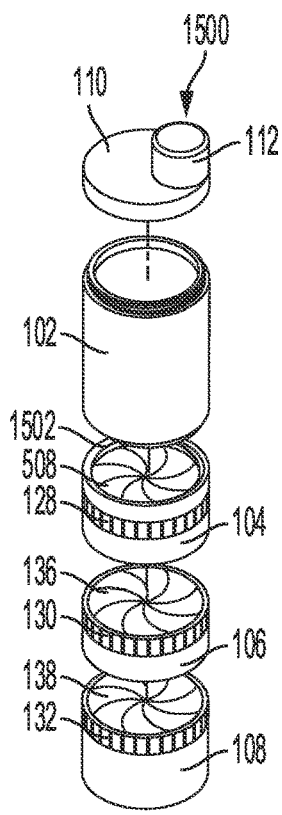
FIG. 15 shows a view of a fifteenth example container, according to one or more examples of the present disclosure.
Figure 16:
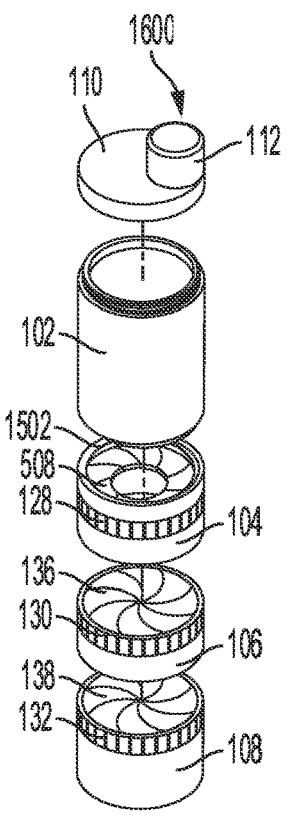
FIG. 16 shows a view of a sixteenth example container, according to one or more examples of the present disclosure.
Figure 17:
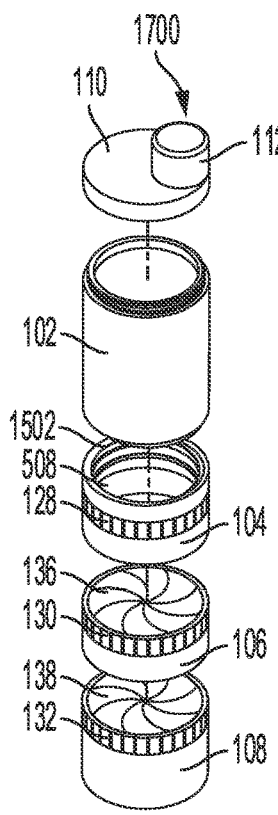
FIG. 17 shows a view of a seventeenth example container, according to one or more examples of the present disclosure.
Figure 18:
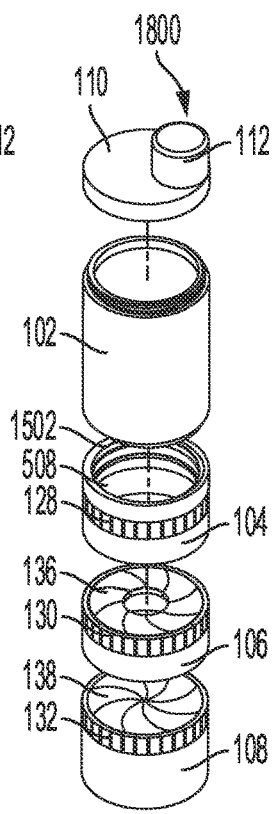
FIG. 18 shows a view of an eighteenth example container, according to one or more examples of the present disclosure.

Looking to FIG. 14, FIG. 14 shows an example cross-sectional view of a fourteenth container 1400. It is noted that the fourteenth container at FIG. 14 may be an alternative view of one of the containers shown in FIGS. 1-13 in at least one example. In particular, fourteenth container 1400 is the same container as shown in FIG. 13 but in a different position.

As seen in FIG. 14, switch 118 is in locked position, where the locked position is a position in which at least one of teeth 1304 is engaged with a corresponding one of the teeth receiving grooves 1302. In particular, compared to FIG. 13, switch 118 has been rotated about a center of head 1308 by tail 1310 being moved in a downward direction so that one of the teeth 1304 has engaged one of the teeth receiving grooves 1302. Via the engagement between one of the teeth 1304 and one of the teeth receiving grooves 1302 as shown in FIG. 14, rotation of shaft 116 may be prevented. However, while FIG. 14 is considered to show a locked position, the position of switch 118 is not a fully locked position. Thus, tail 1310 is positioned outside of housing to still provide an indication at FIG. 14.

A fully locked position of switch 118 is a position in which tail 1310 is positioned against sloped surface 1306 and multiple sets of teeth 1304 are engaged with the corresponding multiple teeth receiving grooves 1304. In the fully locked position, switch 118 is fully received in the housing for the switch 118, and the switch 118 is not easily visible. In such a fully locked position of switch 118, the locking position may be more secure and rotation of shaft 116 may be better prevented than in a position where the switch 118 (and thus shaft 116) is not fully locked.

Via the tail 1310 being visible unless switch 118 in the fully locked state, advantages as to a user being able to quickly evaluate a state of the shaft 116 are achieved. For example, a user may be able to quickly evaluate whether the shaft 116 is unlocked or locked by looking at switch 118, as tail 1310 of switch 118 is visible beyond the housing unless the switch 118 is in fully locked position.

Figure 19:
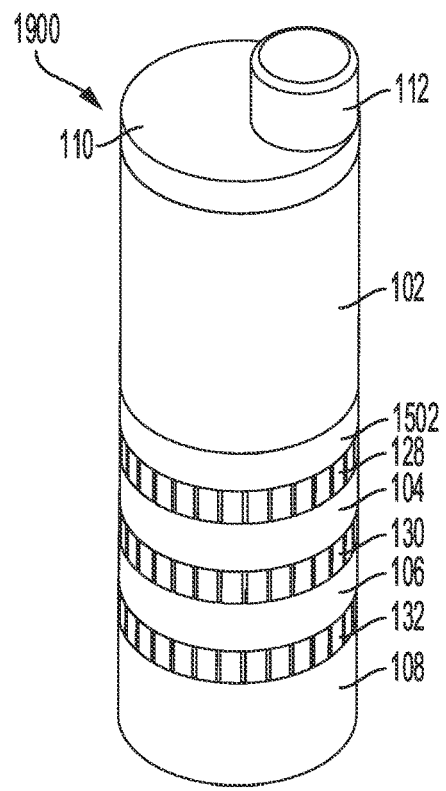
FIG. 19 shows a view of a nineteenth example container, according to one or more examples of the present disclosure.

Turning to FIGS. 15-19, a fifteenth example container 1500, sixteenth example container 1600, seventeenth example container 1700, eighteenth example container 1800, and nineteenth example container 1900 are shown. It is noted that the containers at FIGS. 15-19 may be the same container in different positions. In the examples at FIGS. 15-19, substantially similar features as in the previous example containers are included. However, no lid is shown at access point 112, though a lid may be included in at least one example. Further, a shaft system and alignment mechanisms are not included. Rather, the chambers are coupled to one another via a coupling ring 1502 which includes threaded coupling elements. For example, liquid chamber 102 and first chamber 104 may be coupled via coupling ring 1502. Similar coupling rings may be included between first chamber 104 and second chamber 106, and between second chamber 106 and third chamber 108. Each of first seal 508, second seal 136, and third seal 138 are shown in a closed position at FIG. 15. At FIG. 16, the first seal 508 is shown in a partially open position, while remaining second seal 136 and third seal 138 are shown still in a closed position. At FIG. 17, the first seal 508 is completely open, while the second seal 136 and third seal 138 are shown still in the closed position. At FIG. 18, the first seal 508 is still in the fully open position, the second seal 136 is partially open, and the third seal 138 is shown in a fully closed position. Though not illustrated, in at least one example, third seal 138 may also be transitioned to an at least partially open position. FIG. 19 shows a nineteenth example container 1900 in a fully assembled state. That is, all of the chambers are coupled to one another in FIG. 19.

Figure 20:
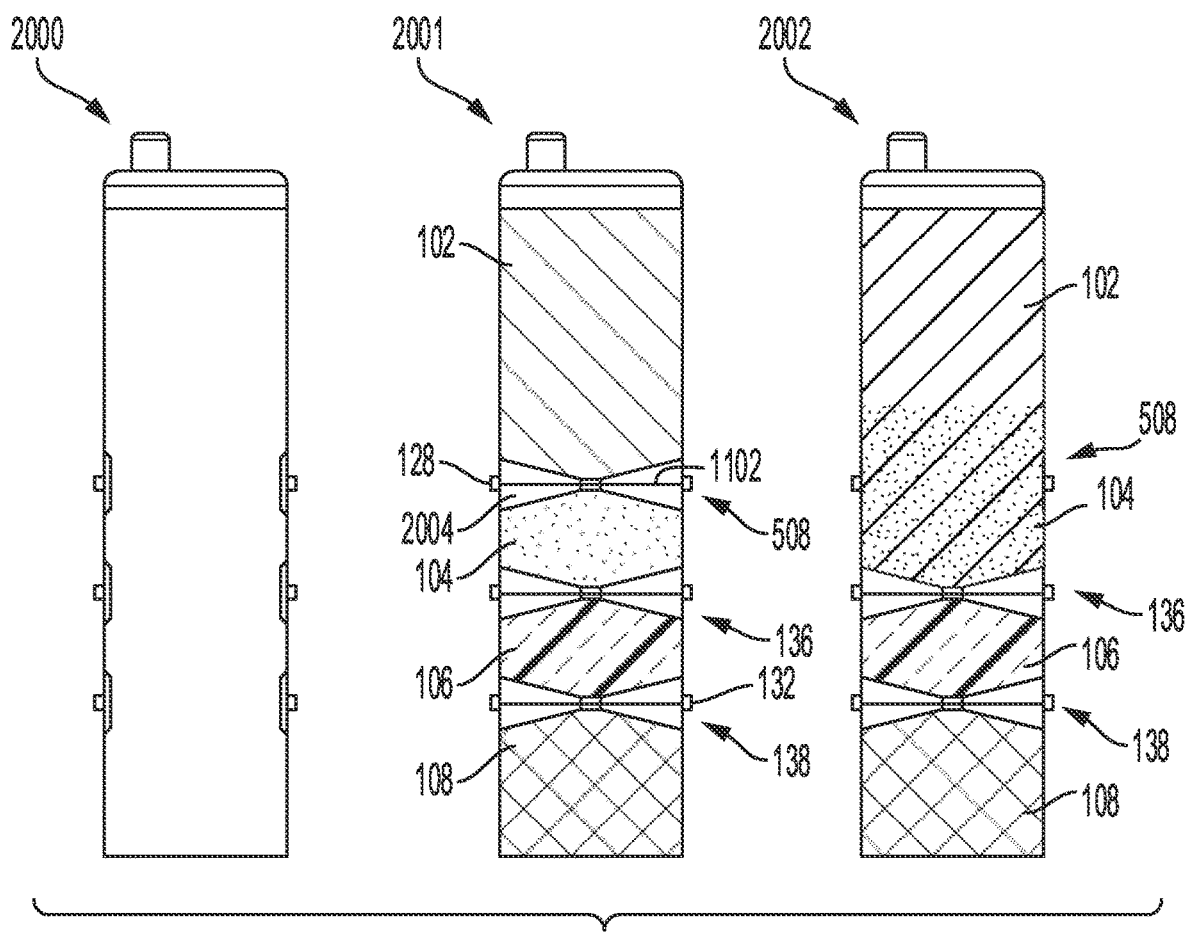
FIG. 20 shows a view of a twentieth example container, according to one or more examples of the present disclosure.
Figure 21:
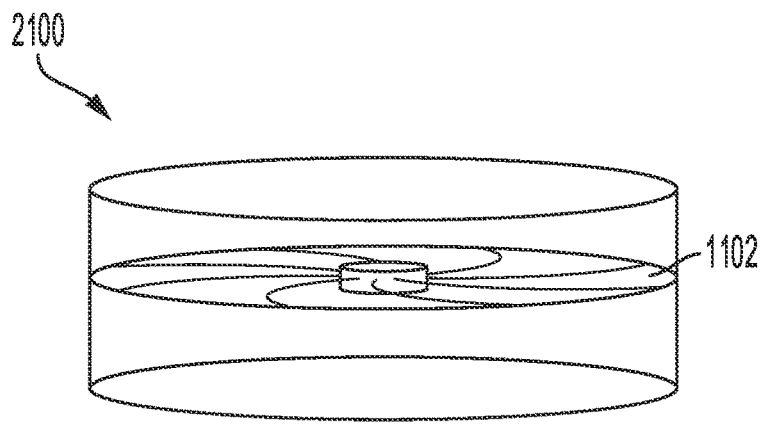
FIG. 21 shows a view of a twenty-first example container, according to one or more examples of the present disclosure.

Turning to FIGS. 20-21, an example side views 2000, 2001, and 2002 are shown of a twentieth example container, and a twenty-first example container 2100 are shown. It is noted that FIGS. 20-21 may be alternative views of one of the containers shown in FIGS. 1-19 in at least one example.

As illustrated, it can be seen in FIG. 21 that spokes 1102 are engaged with an inner surface of external rings. For example, spokes 1102 at first seal 508 are shown engaged with the inner surface of first external ring 128. A material 2004 of first seal 508 is coupled to the spokes 1102. Thus, upon rotation of first external ring 128, the first seal 508 may be transitioned from a closed, liquid tight sealing position at 2001 to an open position at 2002. The other seals, including second seal 136 and third seal 138, may be configured similarly to include engagement between spokes 1102 and an inner surface of corresponding external rings, with a material 2004 of the seals coupled to spokes 1102. As can be seen, mixing is allowed to occur between liquid stored in liquid chamber 102 and supplements or other mixers stored in first chamber 104 when the first seal is transitioned to an open position at 2002.

Figure 22:
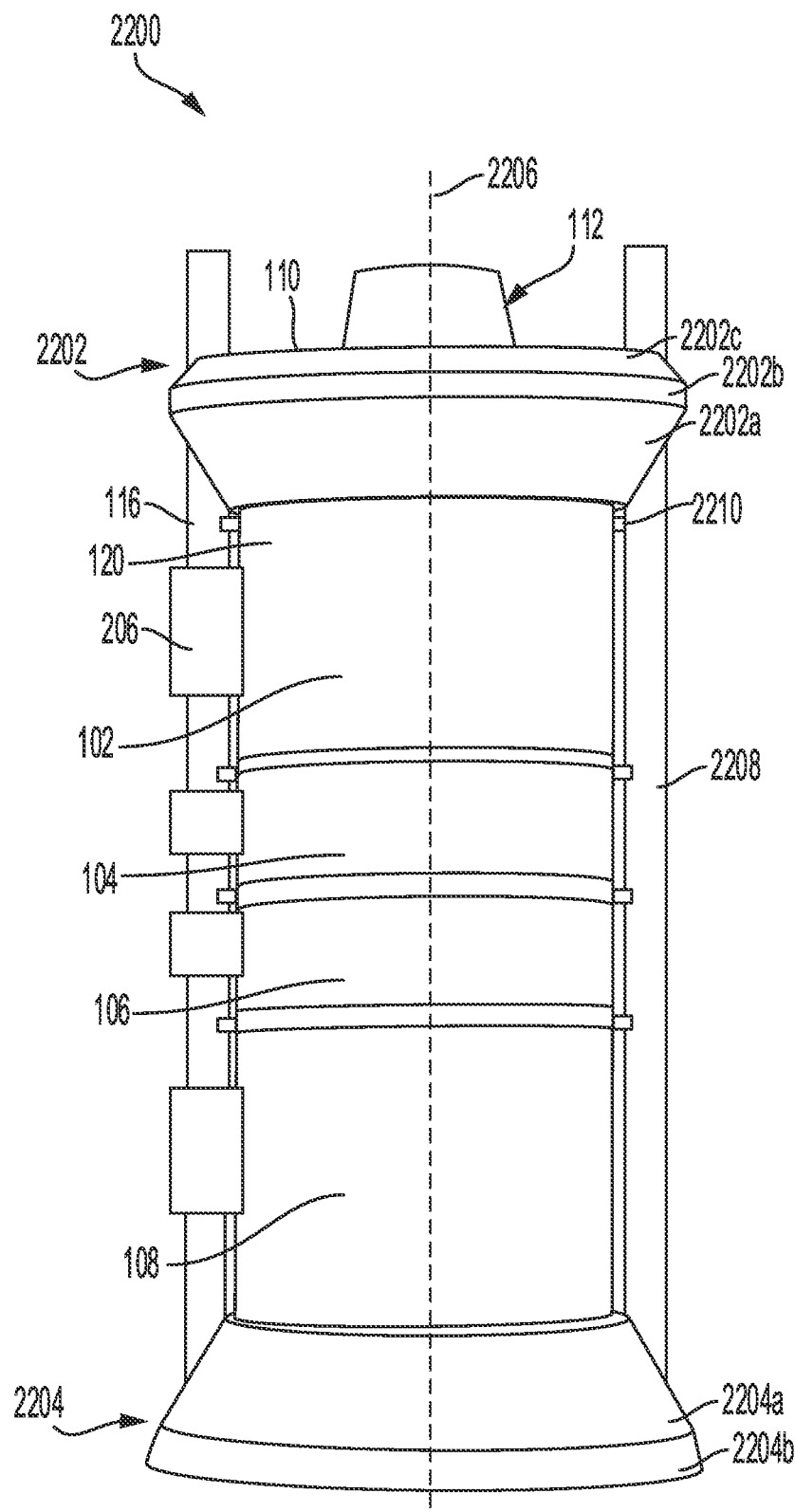
FIG. 22 shows a view of a twenty-second example container, according to one or more examples of the present disclosure.

Turning to FIG. 22, FIG. 22 shows an alternative exterior for a twenty-second example container 2200. As can be seen with the alternative exterior at FIG. 22, twenty-second example container 2200 includes a lid 2202 and a base 2204 that differ from the previously introduced example containers. Lid 2202 and base 2204 are substantially circular in shape. Lid 2202 comprises a first section 2202a, a second section 2202b, and a third section 2202c. The first section 2202a of lid 2202 flares outward away from longitudinal axis 2206 when moving in a direction away from base 2204. Longitudinal axis 2206 is a longitudinal axis of twenty-second example container 2200. Thus, a circumference of first section 2202a at an end closest to base 2204 is smaller than a circumference of the first section 2202a at an end furthest from base 2204. The second section 2202b of lid 2202 is positioned between the first section 2202a and the third section 2202c. The second section 2202b has a substantially constant circumference. The side walls of the second section 2202b are substantially parallel to the longitudinal axis 2206. The circumference of second section 2202b is a same circumference as at the end of the first section 2202a furthest from base 2204. The third section 2202c of lid 2202 tapers inward towards a longitudinal axis 2206 when moving in a direction away from base 2204. Thus, a circumference of the third section 2202c at an end closest to base 2204 is larger than a circumference of the third section 2202c at an end furthest from base 2204.

Base 2204 flares outward away from longitudinal axis 2206 when moving in a direction away from lid 2202. Base 2204 includes a first section 2204a and a second section 2204b. The first section 2204a and the second section 2204b both flare out away from longitudinal axis 2206 when moving in a direction away from lid 2202. Thus, a circumference at the end of base 2204 which forms an end of the twenty-second example container 2200 larger than the remainder of the base. It is noted that the second section 2204b is steeper than the first section 2204b. Twenty-second example container 2200 further includes a second shaft 2208 that extends parallel to the longitudinal axis 2206. Shaft 116 and second shaft 2208 each are coupled to twenty-second example container 2200 via a plurality of connection points 2210. The shaping of the alternative exterior shown at FIG. 22 may help to prevent tipping of the container.

Turning to FIG. 23, FIG. 23 shows views 2300, 2301, and 2302 for a twenty-third example container. As may be seen in view 2301 of FIG. 23, rather than utilizing seals as previously disclosed herein, stack separators may be included. These stack separators comprise a first disk 2304 and a second disk 2306 that are positioned between the chambers. The first disk 2304 and the second disk 2306 may be rotated relative to one another to adjust an amount of opening overlap (and thus amount of communication) allowed between chambers. In at least one example, an entire chamber may be rotated to rotate the first disk 2304 relative to the second disk 2306 included between each of the two adjacent chambers. For example, first chamber 104 may be rotated to adjust the disk positioning. Additionally, third chamber 108 may be rotated to adjust the disk positioning.

Turning to FIGS. 24-25, FIG. 24 shows a twenty-fourth example container 2400 and FIG. 25 shows a twenty-fifth example container 2500. In at least one example, FIGS. 24 and 25 may be alternative view of the same container. As seen in FIGS. 24 and 25, a stacking configuration is shown, where the chambers are coupled via coupling threads. Further, a lid 2402 forms an entire top surface of the containers in FIGS. 24 and 25. External rings in FIGS. 24 and 25 are included. In at least one example, the first external ring 128, second external ring 130, and third external ring 132 in FIGS. 24-25 may rotate a first disk relative to a second disk to vary an alignment of openings in the disks and adjust communication between the chambers. The disks may be first disk 2304 and second disk 2306, in at least one example.

Turning now to FIG. 26, a twenty-sixth example container 2600 is shown, and at FIG. 27, a twenty-seventh example container in a first position 2700 is shown and the twenty-seventh example container in a second position 2701 is shown. The twenty-sixth example container 2600 may be the same container as shown in FIG. 27 in at least one example. FIGS. 26 and 27 are described together below.

As may be seen at FIG. 26, first chamber 104, second chamber 106, and third chamber 108 are vertically stacked within a first cylindrical structure 2604, with dividers dividing each of the chambers. Moreover, an opening 2602 extends vertically across each of the chambers, the opening formed into the cylindrical structure. Additionally, a second cylindrical structure 2606 is shown with a diameter that is slightly larger diameter of first cylindrical structure 2604. In this way, the first cylindrical structure 2604 may be nested in the second cylindrical structure 2606 with a relatively tight fit while still allowing rotation of the first cylindrical structure 2604 relative to the second cylindrical structure 2606.

The second cylindrical structure includes a first opening 2608, a second opening 2610, and a third opening 2612 (see FIGS. 26-27). Each of the first opening 2608, second opening 2610, and third opening 2612 are sized and positioned such that, upon positioning first cylindrical structure 2604 within second cylindrical structure 2606, the first opening 2608, second opening 2610, and third opening 2612 align with first chamber 104, second chamber 106, and third chamber 108, respectively.

A positioning tube 2614 may extend from a top surface of the first cylindrical structure 2604. The chamber positioning tube 2614 may fit into a lid positioning tube 2616, which extends downward from chamber adjustment mechanism 2618, which is positioned on the lid.

By positioning the first cylindrical structure 2604 within the second cylindrical structure 2606, and coupling the chamber positioning tube 2164 with the lid positioning tube 2616, rotation of the chamber adjustment mechanism 2618 may result in rotation of first cylindrical structure 2604 relative to second cylindrical structure 2606. As the first cylindrical structure 2604 is rotated relative to second cylindrical structure 2606, the chambers are exposed by openings in the second cylindrical structure 2606 one at a time. In order to indicate which chamber is being exposed as the chamber adjustment mechanism is rotated, indicia 2620 may be included on top of the lid. If the chamber adjustment mechanism 2618 is rotated to point at "3," for example, then the cylindrical structures are positioned such that the third chamber 108 is exposed. It is noted that the first cylindrical structure 2604 and second cylindrical structure 2606 are positioned within a liquid chamber, such as a bottle (not shown). The lid is further coupled to the liquid chamber. Thus, exposure of the chambers enables mixing of any supplements that may be stored in the chambers with liquid that may be stored in the liquid chamber.

Thus, disclosed herein is a container and methods. The container may comprise a first chamber that is positioned between a liquid chamber and a second chamber, a first seal that is positioned between the first chamber and the liquid chamber, and a second seal that is positioned between the second chamber and the first chamber. By rotating a first external ring of the container that is positioned between the liquid chamber and the first chamber of the container a first liquid tight seal is opened to enable communication between the liquid chamber and the first chamber. The first external ring may be positioned at a first end of the liquid chamber that is opposite a second end of the liquid chamber that includes a drinking opening. Similarly, rotation of a second external ring positioned between the second chamber and the first chamber may open a second liquid tight seal to enable communication between the second chamber, the first chamber, and the liquid chamber.

Turning now to FIGS. 28-30, further example containers are shown, including twenty-eighth example container 2800, twenty-ninth example container 2900, and thirtieth example container 3000. In at least one example, the example containers shown in FIGS. 28-30 may be various views of the same container.

FIG. 28 shows a twenty-eighth example container 2800 including a lid 2802 with an opening positioned therein. As seen at FIG. 30, lid 2802 includes threading for coupling purposes. In addition to lid 2802, FIG. 28 shows a top divider 2804 which fits onto multi-chamber housing 2806, where multi-chamber housing 2806 includes first chamber 104, second chamber 106, and third chamber 108 contained therein. The first chamber 104, second chamber 106, and third chamber 108 are separated via dividers positioned inside of multi-chamber housing 2806. It is further noted that top divider 2804 includes projections on a bottom surface to create a tight fit with multi-chamber housing 2806. The projections on the bottom surface of top divider 2804 are shown at least at FIG. 30.

As seen in FIG. 29, multi-chamber housing 2806 includes a plurality of valves. In particular, each of first chamber 104, second chamber 106, and third chamber 108 includes a valve positioned in a bottom thereof. In particular, first chamber 104 includes a first valve 2902, second chamber 106 includes a second valve 2904, and third chamber 108 includes a third valve 2906. The multi-chamber housing 2806 further includes a shaft receiving opening 2808 for receiving shaft 2810 of chamber outer sleeve 2812, when multi-chamber housing 2806 is positioned within chamber outer sleeve 2812. The first valve 2902, second valve 2904, and third valve 2906 are accessible from an exterior of the container upon positioning the multi-chamber housing 2806 within chamber outer sleeve 2812. The first valve 2902, second valve 2904, and third valve 2906 may be used to adjust openings in a bottom of their respective chamber. For example, as seen in FIG. 30, second valve 2904 may be used to adjust a second chamber opening 3004. Third valve 2906 may be used to adjust a third chamber opening 3002. Should one or more of the valves be used to transition a chamber opening to an open position, communication may be enabled between the chamber and liquid chamber 102. It is noted that a mixing element 502 is positioned between the first chamber 104, second chamber 106, and third chamber 108 to improve mixing.

Turning now to FIG. 31, an example method for a container comprising multiple chambers 3100 is disclosed. Step 3102 of method 3100 includes closing inter-chamber seals. Closing the inter-chamber seals includes creating liquid tight inter-chamber seals, as has been discussed above. For example, the first seal 508, second seal 136, and third seal 138 may be closed via rotation of corresponding first external ring 128, second external ring 130, and third external ring 132.

As another example, disks, such as first disk 2304 and second disk 2306, may need to be rotated relative to one another to ensure their openings are not aligned to close the inter-chamber seals. As a further example, valves may need to be moved to a closed position to close the inter-chamber seals. For example, first valve 2902, second valve 2904, and third valve 2906 may need to be set to a position which closes corresponding chamber openings (such as third chamber opening 3002 and second chamber opening 3004). Alternatively, in cases where a first cylindrical structure is being fit within a second cylindrical structure to form seals (such as first cylindrical structure 2604 being fit within second cylindrical structure 2606), inter-chamber seals may not need to be closed.

Following step 3102, method 3100 may include loading dry and liquid products into separate chambers of a container at step 3104. In at least one example, loading the dry and liquid products into separate chambers may include rotating one or more chambers about a shaft to enable access to the chambers. Additionally or alternatively, a cover (such as a lid) of the chambers may need to be removed.

In one or more examples, the dry products may be multiple different supplements, and each of these multiple different supplements may be loaded into different chambers. For example, a first supplement may be loaded into a first chamber, a second supplement may be loaded into a second chamber, and a third supplement may be loaded into a third chamber. Liquid may further be loaded into a liquid chamber. The first chamber, second chamber, third chamber, and liquid chamber are all part of the same container. The first chamber, second chamber, third chamber, and liquid chamber may correspond to any one or more of the example containers disclosed herein. In at least one example, the supplements may be loaded into the chambers as discussed at FIG. 1. As the inter-chamber seals have been closed, the dry products may be kept separate and dry from any liquids and other dry products within the container.

Loading the dry and liquid products into separate chambers may include aligning and locking the chambers in an aligned formation. For example, the chambers may be aligned such as shown in FIG. 2, and the locking mechanisms 134 and/or the switch 118 may be transitioned to a locked stated.

It is noted that in a case where the container comprises the cylindrical configuration discussed above, loading the dry and liquid products into separate chambers of the container may include loading supplements into each of the first chamber, second chamber, and third chamber of the first cylindrical structure. Then, the first cylinder is positioned within the second cylindrical structure such that all openings of the second cylindrical structure are offset from the opening exposing the chambers of the first cylindrical structure. The nested first and second cylindrical structures are then positioned within a liquid chamber and coupled to the lid of the container via positioning tubes, where the liquid chamber contains liquid therein.

Once the dry and liquid products are loaded into separate chambers of the container, a first seal is opened via rotation to enable communication between a liquid chamber and a first chamber at step 3106. In at least one example, rotation may include rotation of a first external ring, as discussed at FIG. 1. By rotating the first external ring, the first seal between the liquid chamber and first chamber is transitioned from a closed position to an open position. In at least one example, a pre-workout supplement may be loaded in the first chamber. Thus, the liquid chamber and the pre-workout supplement in the first chamber may be mixed via opening the first seal.

In one or more examples, rotation may include rotation of a chamber itself, such as in the disk configuration. In at least one example, rotation may include rotation of a valve for a first chamber. In one or more examples, one of a first cylindrical structure and a second cylindrical structure may need to be rotated in order to open a first seal to enable communication between a liquid chamber and the first chamber.

At 3108, method 3100 includes opening a second seal via rotation to enable communication between the liquid chamber and a second chamber. In one or more examples, a supplement to be taken during a workout may be stored in the second chamber.

Rotation to open the second seal may include rotation of a second external to open a second seal, as discussed above. In one or more examples, rotation may include rotation of a chamber itself, as in the disk configuration. In at least one example, rotation may include rotation of a valve for a second chamber. In one or more examples, one of a first cylindrical structure and a second cylindrical structure may need to be rotated further in order to open a second seal and enable communication between a liquid chamber and the second chamber.

In cases where the first chamber is positioned between the second chamber and the liquid chamber, the seal opened to enable communication between the first chamber and the liquid chamber may be maintained open at step 3108.

At 3110, method 3100 includes opening a third seal via rotation to enable communication between the liquid chamber and a second chamber. In one or more examples, a supplement to be taken post-workout may be stored in the third chamber.

Rotation to open the second seal may include rotation of a third external to open a third seal, as discussed above. In one or more examples, rotation may include rotation of a chamber itself, as in the disk configuration. In at least one example, rotation may include rotation of a valve for a third chamber. In one or more examples, one of a first cylindrical structure and a second cylindrical structure may need to be rotated further in order to open a third seal and enable communication between a liquid chamber and the third chamber.

In cases where the first chamber and second chamber are positioned between the third chamber and the liquid chamber, the seal opened to enable communication between the first chamber and the liquid chamber and the seal opened to enable communication between the second chamber and the liquid chamber are maintained open at step 3110.

In this way, the container disclosed herein enables easy and efficient use of multiple supplements at different points in time. Moreover, the technical effects of improved dry storage and compact dimensions of the multi-chambered container are achieved for the use of multiple, different supplements (especially supplements that are in powder form). Further, the container disclosed herein enable varied supplement to liquid ratios to be used, improving a flexibility and capacity of the disclosed container to create different supplement mixtures. Additionally, in examples where a mixing element may be included as disclosed herein, advantages as to improved mixing of supplements and liquids may be achieved.

While examples of mixing liquid from the liquid chamber with mixing items from one or more of the first chamber, second chamber, and third chamber are described, it is noted that various sequences of mixing are possible. For example, contents of the first chamber and the second chamber (e.g., different supplements) may be mixed first prior to introducing liquid from the liquid chamber and while keeping the third chamber separate. In this way, the multi-chambered containers described herein enable a highly adaptable storage and mixing option that is handheld.

As one embodiment, a container may comprise a first chamber positioned between a liquid chamber and a second chamber; a first seal positioned between the first chamber and the liquid chamber; and a second seal positioned between the second chamber and the first chamber. In a first example of the container, each of the first seal and the second seal are liquid tight in a closed position. A second example of the container optionally includes the first example and further includes wherein each of the first seal and the second seal are transitioned between the closed position and an open position via rotation of the first seal and the second seal. A third example of the container optionally includes one or more of the first and second examples, and further includes wherein the liquid chamber is defined by a sidewall of the container, a top of the container, and the first rotatable seal. A fourth example of the container optionally includes one or more of the first through third examples, and further includes, wherein a first sidewall continuously surrounds the first chamber and wherein a second sidewall continuously surrounds the second chamber, the first sidewall and the second sidewall being separate from one another. A fifth example of the container optionally includes one or more of the first through fourth examples, and further comprises a shaft extending parallel to a longitudinal axis of the container, the shaft coupling the first chamber, the second chamber, and the liquid chamber to each other. A sixth example of the container optionally includes one or more of the first through fifth examples, wherein the shaft includes a locking mechanism, wherein the locking mechanism prevents movement of the shaft in a locked position. A seventh example of the container optionally includes one or more of the first through sixth examples, wherein a switch of the locking mechanism is movable to transition the shaft between the locked position and an unlocked position, wherein the switch is engaged with the shaft in the locked position. An eighth example of the container optionally includes one or more of the first through seventh examples, wherein the first chamber, the second chamber, and the liquid chamber are independently rotatable about the shaft. A ninth example of the container optionally includes one or more of the first through eighth examples, wherein a drinking opening is positioned at a first end of the liquid chamber, and wherein the first seal is positioned at a second end of the liquid chamber, wherein the second end of the liquid chamber is opposite the first end of the liquid chamber. A tenth example of the container optionally includes one or more of the first through ninth examples, and further comprises a third chamber and a third seal positioned between the third chamber and the second chamber, wherein the third chamber is larger than the first chamber and the second chamber.

As a second embodiment, a container comprises a liquid chamber, a first chamber coupled between the liquid chamber and a second chamber, a first seal coupled between the liquid chamber and the first chamber, and a shaft extending along a length of the container, the shaft coupling the liquid chamber, the first chamber, and the second chamber to one another. A first example of the container optionally includes, wherein the liquid chamber, the first chamber, and the second chamber are independently rotatable about the shaft. A second example of the container optionally includes the first example, and further comprises a third chamber and a third seal positioned between the second chamber and the third chamber, wherein each of the first seal, the second seal, and the third seal comprise a flexible material and are liquid tight in a closed position. A third example of the container optionally includes one or more of the first through second examples, wherein the first seal, the second seal, and the third seal each comprise a plurality of spokes, each of the plurality of spokes coupled to a corresponding ring of the first seal, the second seal, and the third seal, wherein the corresponding ring for each of the first seal, the second seal, and the third seal is accessible from an exterior of the container. A fourth example of the container optionally includes one or more of the first through third examples, wherein each of the plurality of the plurality of spokes is further coupled to the flexible material. A fifth example of the container optionally includes one or more of the first through fourth examples, wherein the plurality of spokes comprise a flexible material.

As a third embodiment, a method (which may be carried out with a container including one or more of the features disclosed herein) comprises rotating a first external ring of a container that is positioned between a liquid chamber and a first chamber of the container, and opening a first liquid tight seal formed between the liquid chamber and the first chamber to enable liquid communication between the liquid chamber and the first chamber, wherein the first external ring is positioned at a first end of the liquid chamber, and wherein the first end of the liquid chamber is opposite a second end of the liquid chamber, the second end of the liquid chamber including a drinking opening. A first example of the method includes rotating a second external ring of the container that is positioned between the first chamber and a second chamber to open a second liquid tight seal formed between the second chamber and the first chamber. A second example of the method optionally includes the first example, wherein unlocking the second liquid tight seal enables liquid communication between the liquid chamber, the first chamber, and the second chamber.

In another representation additional or fewer chambers may be included with associated features, such as external rings, alignment mechanisms, and gaskets.

Note that the example methods included herein can be used with various container configurations. Likewise, please note the order of processing is not necessarily required to achieve the features and advantages of the example embodiments described herein, but is provided for ease of illustration and description. One or more of the illustrated actions, operations, and/or functions may be repeatedly performed depending on the particular strategy being used.

It will be appreciated that the configurations and routines disclosed herein are exemplary in nature, and that these specific embodiments are not to be considered in a limiting sense, because numerous variations are possible.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A container, comprising:
a first chamber;
a second chamber; and
a liquid chamber; the first chamber positioned between the liquid chamber and the second chamber;
a first seal positioned between the first chamber and the liquid chamber; and
a second seal positioned between the second chamber and the first chamber, wherein the first seal and the second seal are each independently operable to open and close communication between the chambers; and further comprising,
a shaft extending parallel to a longitudinal axis of the container, the shaft coupling the first chamber, the second chamber, and the liquid chamber to each other; wherein the shaft allows each of the first chamber, the second chamber, and the liquid chamber to rotate into and out of alignment.

2. The container of claim 1, wherein each of the first seal and the second seal are liquid tight in a closed position.

3. The container of claim 2, wherein the liquid chamber is defined by a sidewall, a top of the container, and the first seal.

4. The container of claim 1, wherein a first sidewall surrounds the first chamber and wherein a second sidewall surrounds the second chamber.

5. The container of claim 1, wherein the shaft includes a locking mechanism, wherein the locking mechanism prevents movement of the shaft in a locked position.

6. The container of 5, wherein the locking mechanism comprises a switch, said switch being movable to transition the shaft between the locked position and an unlocked position, and wherein the switch is engaged with the shaft in the locked position.

7. The container of claim 1, wherein the first chamber, the second chamber, and the liquid chamber are independently rotatable about the shaft.

8. The container of claim 1, wherein an access point is positioned at a first end of the liquid chamber, wherein the first seal is positioned at a second end of the liquid chamber, and wherein the second end of the liquid chamber is opposite the first end of the liquid chamber.

9. The container of claim 1, further comprising a third chamber and a third seal positioned between the third chamber and the second chamber, wherein the third chamber is larger than the first chamber and the second chamber.

10. A container, comprising:
a liquid chamber;
a first chamber; and
a second chamber, the first chamber coupled between the liquid chamber and the second chamber;
a first seal coupled between the liquid chamber and the first chamber; and
a shaft extending along a length of the container, the shaft coupling the liquid chamber, the first chamber, and the second chamber to one another.

11. The container of claim 10, wherein the shaft includes a locking mechanism, and wherein the locking mechanism allows the first chamber and the second chamber to be independently rotatable about the shaft in an unlocked position.

* * * * *